United States Patent
Zhang et al.

(10) Patent No.: US 11,802,182 B2
(45) Date of Patent: *Oct. 31, 2023

(54) SILICONE HYDROGEL CONTACT LENSES

(71) Applicant: Alcon Inc., Fribourg (CH)

(72) Inventors: Steve Yun Zhang, Sugar Hill, GA (US); Daqing Wu, Suwanee, GA (US); Junhao Ge, Shanghai (CN); Richard Charles Breitkopf, Dunwoody, GA (US); Xinming Qian, Johns Creek, GA (US); Zach Munoz, Fremont, CA (US); Matthew D. Nelson, Salt Lake City, UT (US); Augustine Twum Kumi, Grayson, GA (US); Weihong Lang, Suwanee, GA (US); Ying Zheng, Suwanee, GA (US); Feng Jing, Snellville, GA (US); Frank Chang, Cumming, GA (US)

(73) Assignee: Alcon Inc., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,559

(22) Filed: May 12, 2022

(65) Prior Publication Data
US 2022/0275154 A1     Sep. 1, 2022

Related U.S. Application Data

(63) Continuation of application No. 17/038,293, filed on Sep. 30, 2020, now Pat. No. 11,365,288, which is a
(Continued)

(51) Int. Cl.
*C08G 77/442*     (2006.01)
*C08G 77/20*     (2006.01)
(Continued)

(52) U.S. Cl.
CPC ...... *C08G 77/442* (2013.01); *B29D 11/00134* (2013.01); *C08G 77/12* (2013.01); *C08G 77/14* (2013.01); *C08G 77/20* (2013.01); *C08G 77/388* (2013.01); *C08G 77/392* (2013.01); *C08L 83/10* (2013.01); *G02B 1/043* (2013.01);
(Continued)

(58) Field of Classification Search
CPC ...................................................... G02B 1/043
See application file for complete search history.

(56) References Cited

U.S. PATENT DOCUMENTS 10,843,422 B2 * 11/2020 Wu .................. G02B 1/043
10,875,967 B2 * 12/2020 Zhang .................. C08G 77/14
(Continued)

FOREIGN PATENT DOCUMENTS

JP     2007279690 A     10/2007
JP     2012527509 A     11/2012
(Continued)

*Primary Examiner* — Michael F Pepitone
(74) *Attorney, Agent, or Firm* — Jian Zhou

(57) ABSTRACT

The present invention generally relates to inherently wettable silicone hydrogel contact lenses having relatively high oxygen permeability, relatively high equilibrium water content and relatively low elastic modulus. The present invention is also related to a method for making such inherently wettable silicone hydrogel contact lenses.

20 Claims, 1 Drawing Sheet

Related U.S. Application Data continuation of application No. 16/000,933, filed on Jun. 6, 2018, now Pat. No. 10,875,967.

(60) Provisional application No. 62/516,215, filed on Jun. 7, 2017.

(51) Int. Cl.
*C08G 77/388* (2006.01)
*C08G 77/392* (2006.01)
*C08G 77/14* (2006.01)
*C08L 83/10* (2006.01)
*G02B 1/04* (2006.01)
*C08G 77/12* (2006.01)
*B29D 11/00* (2006.01)
*G02C 7/04* (2006.01)

(52) U.S. Cl.
CPC ........... *G02C 7/04* (2013.01); *C08G 2210/00* (2013.01); *C08L 2201/10* (2013.01); *G02B 2207/109* (2013.01)

(56) References Cited

U.S. PATENT DOCUMENTS

| | | | |
|---|---|---|---|
| 11,365,288 B2* | 6/2022 | Zhang | C08G 77/14 |
| 2007/0242219 A1 | 10/2007 | Zanini | |
| 2008/0312397 A1 | 12/2008 | Lai et al. | |
| 2009/0234089 A1* | 9/2009 | Ueyama | C08F 8/42 |
| | | | 526/279 |
| 2010/0296049 A1 | 11/2010 | Justynska | |
| 2012/0088861 A1 | 4/2012 | Huang | |
| 2013/0095235 A1 | 4/2013 | Bothe et al. | |
| 2016/0311981 A1 | 10/2016 | Kudo | |
| 2018/0100038 A1 | 4/2018 | Jing et al. | |

FOREIGN PATENT DOCUMENTS

| | | |
|---|---|---|
| JP | 2013543536 A | 12/2013 |
| JP | 2014089477 A | 5/2014 |
| JP | 2014534467 A | 12/2014 |
| JP | 2016204534 A | 12/2016 |

* cited by examiner

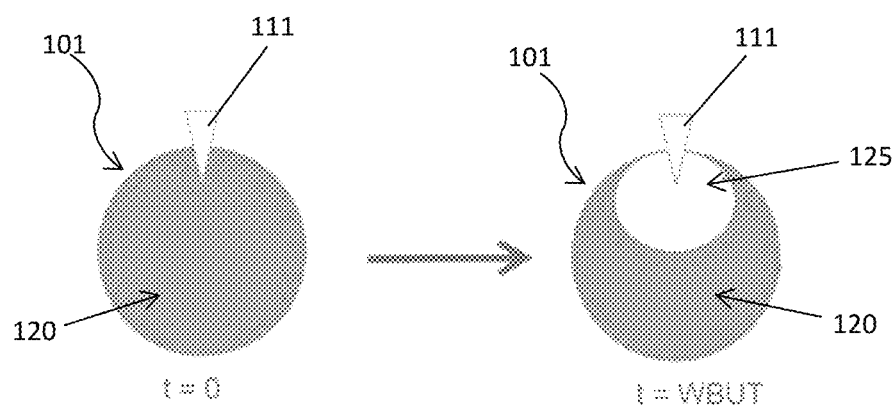

SILICONE HYDROGEL CONTACT LENSES

This application is a continuation of application Ser. No. 17/038,293 filed 30 Sep. 2020, now U.S. Pat. No. 11,365,288, which is a continuation of application Ser. No. 16/000,933 filed 6 Jun. 2018, now U.S. Pat. No. 10,875,967, which claims the benefit under 35 USC § 119 (e) of U.S. provisional application No. 62/516,215 filed 7 Jun. 2017, herein incorporated by reference in its entirety.

The present invention generally relates to silicone hydrogel contact lenses having an inherently wettable surface and to a method for producing the same.

BACKGROUND

Silicone hydrogel (SiHy) contact lenses, which are made of a hydrated, crosslinked polymeric material that contains silicone and a certain amount of water within the lens polymer matrix at equilibrium, are increasingly becoming popular, because they have minimal adverse effects on corneal health due to their high oxygen permeability. But, incorporation of silicone in a contact lens material can have undesirable effects on the hydrophilicity and wettability of SiHy contact lenses, because silicon is hydrophobic and has a great tendency to migrate onto the lens surface being exposed to air. Contact lenses manufacturers have made a great effort in developing SiHy contact lenses having a hydrophilic and wettable surface.

One approach for modifying the hydrophilicity and wettability of a SiHy contact lens is through the use of a plasma treatment, for example, commercial lenses, such as AIR OPTIX® (Alcon), PremiO™ (Menicon), and PUREVISION™ (Bausch & Lomb), utilize this approach in their production processes. Although a plasma coating is durable and can provide an adequate hydrophilicity/wettability, plasma treatment of SiHy contact lenses may not be cost effective, because the preformed SiHy contact lenses must typically be dried before plasma treatment and because of relative high capital investment associated with plasma treatment equipment.

Another approach is to attach hydrophilic polymers onto the SiHy contact lens according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, U.S. Pat. Appl. Pub. Nos. 2009-0145086 A1, 2009-0145091 A1, 2008-0142038 A1, and 2007-0122540 A1). Although those techniques can be use in rendering a SiHy contact lens wettable, they may not be cost-effective and/or time-efficient for implementation in a mass production environment, because they typically require relatively long time and/or involve laborious, multiple steps to obtain a hydrophilic coating.

Another approach is a layer-by-layer (LbL) polyionic material deposition technique (see, e.g., U.S. Pat. Nos. 6,451,871, 6,719,929, 6,793,973, 6,884,457, 6,896,926, 6,926,965, 6,940,580, 7,297,725, 8,044,112, 7,858,000, and 8,158,192). Although the LbL deposition technique can provide a cost effective process for rendering a SiHy contact lens wettable, LbL coatings may not be as durable as plasma coatings and may have relatively high densities of surface charges; which may interfere with contact lens cleaning and disinfecting solutions. To improve the durability, crosslinking of LbL coatings on contact lenses has been proposed in U.S. Pat. Nos. 8,147,897 and 8,142,835. However, cross-linked LbL coatings may have a hydrophilicity and/or wettability inferior than original LbL coatings (prior to cross-linking) and still have relative high densities of surface charges.

Recently, a new approach has been described in U.S. Pat. No. 8,529,057 for applying a non-silicone hydrogel coating onto a SiHy contact lens directly in a lens package during autoclave (sterilization). Although this new approach can provide silicone hydrogel contact lenses with durable hydrophilic coatings thereon, it may not be environmentally friendly manufacturing process because it involves use of organic solvents in lens processing steps after the lens molding step.

Another approach is the incorporation of preformed hydrophilic polymers as polymeric wetting agents in a lens formulation for making SiHy contact lens as proposed in U.S. Pat. Nos. 6,367,929, 6,822,016, 7,052,131, and 7,249,848. This method may not require additional processes for modifying the hydrophilicity and wettability of SiHy contact lenses after cast-molding. However, polymeric wetting agents may not be compatible with the silicone components in the lens formulation and the incompatibility may impart haziness to the resultant lenses. Further, such surface treatment may not provide a durable surface for extended wear purposes.

A further approach is the incorporation of monomeric wetting agents (e.g., N-vinylpyrrolidone, N-vinyl-N-methyl acetamide, or the like) in a lens formulation for making SiHy contact lens as proposed in U.S. Pat. Nos. 6,867,245, 7,268,198, 7,540,609, 7,572,841, 7,750,079, 7,934,830, 8,231,218, 8,367,746, 8,445,614, 8,481,662, 8,487,058, 8,513,325, 8,703,891, 8,820,928, 8,865,789, 8,937,110, 8,937,111, 9,057,821, 9,057,822, 9,121,998, 9,125,808, 9,140,825, 9,140,908, 9,156,934, 9,164,298, 9,170,349, 9,188,702, 9,217,813, 9,296,159, 9,322,959, 9,322,960, 9,360,594, 9,529,119. Commercial SiHy contact lenses, such as, Biofinity® (CooperVision, Dk=128 barrers, 48% $H_2O$), Avaira® (CooperVision, Dk=100 barrers, 46% $H_2O$), Clariti® (CooperVision, Dk=60 barrers, 56% $H_2O$), MyDay® (CooperVision, Dk=80 barrers, 54% $H_2O$), ULTRA™ (Bausch & Lamb, Dk=114 barrers, 46% $H_2O$), may utilize this approach in their production processes. Although this approach might be used in the commercial SiHy lens production to provide fresh (unused) SiHy lenses with adequately hydrophilic surfaces, there are some limitations. For example, the higher oxygen permeability of a SiHy contact lens could be achieved according to this approach, but at the expense of its equilibrium water content and atomic Si percentage at lens surface. Typically, relatively-lower equilibrium water content and relatively-higher atomic Si percentage go with higher oxygen permeability in tandem. Further, it may also have one or more of the following disadvantages: slightly-high haziness due to the incompatibility of polymerizable silicone components with monomeric wetting agents and other hydrophilic components; higher surface silicone contents; susceptibility to form dry spots and/or hydrophobic surface areas created due to air exposure, dehydrating-rehydrating cycles, shearing forces of the eyelids, silicone migration to the surface, and/or partial failure to prevent silicone from exposure; and not-adequate lubricity.

SUMMARY OF THE INVENTION

The invention, in one aspect, provides a silicone hydrogel contact lens, comprising a silicone hydrogel bulk material which comprises (1) first repeating units of at least one siloxane-containing vinylic monomer having 0 to 10 first H-donor moieties, (2) second repeating units of at least one first polysiloxane vinylic crosslinker which has a number average molecular weight of from about 3000 Daltons to about 80,000 Daltons and comprises (a) two terminal (meth) acryloyl groups, (b) at least one polysiloxane segment comprising dimethylsiloxane units and hydrophilized siloxane units each having one methyl substituent and one monovalent $C_4$-$C_{40}$ organic radical substituent having one or more second H-donor moieties, and (c) from 0 to 20 third H-donor moieties which are integral parts of molecular structures outside of the polysiloxane segment, (3) third repeating units of at least one hydrophilic N-vinyl amide monomer, and (4) optionally fourth repeating units of at least one second polysiloxane vinylic crosslinker having 0 to 35 fourth H-donor moieties, wherein the first and second polysiloxane vinylic crosslinkers are different from each other, wherein the first, second, third and fourth H-donor moieties independent of one another are hydroxyl groups, carboxyl groups, amino groups of —$NHR°$, amino linkages of —NH—, amide linkages of —CONH—, urethane linkages of —OCONH—, or combinations thereof, wherein $R°$ is H or a $C_1$-$C_4$ alkyl, wherein the silicone hydrogel bulk material comprises at least 8.8 mmole of the third repeating units per gram of all the first, second and fourth repeating units in total and at least 0.11 meqs of all the first, second, third and fourth H-donor moieties in total per gram of the third repeating units, wherein the silicone hydrogel contact lens has an oxygen permeability of at least 50 barrers, an elastic modulus of from about 0.2 MPa to about 1.5 MPa, and an equilibrium water content of from about 40% to about 70% and is inherently wettable as characterized by having a water-break-up-time of at least 10 seconds and a water contact angle by captive bubble of about 80 degrees or less without being subjected to any post-curing surface treatment.

In another aspect, the present invention provides a method for producing inherently-wettable silicone hydrogel contact lenses. The method comprises the steps of: preparing a polymerizable composition which is clear at room temperature and optionally but preferably at a temperature of from about 0 to about 4° C., wherein the polymerizable composition comprises (a) at least one siloxane-containing vinylic monomer having 0 to 10 first H-donor moieties, (b) at least one first polysiloxane vinylic crosslinker which has a number average molecular weight of from about 3000 Daltons to about 80,000 Daltons and comprises (i) two terminal (meth) acryloyl groups, (ii) at least one polysiloxane segment comprising dimethylsiloxane units and hydrophilized siloxane units each having one methyl substituent and one monovalent $C_4$-$C_{40}$ organic radical substituent having one or more second H-donor moieties, and (iii) from 0 to 20 third H-donor moieties which are integral parts of molecular structures outside of the polysiloxane segment, (c) at least one hydrophilic N-vinyl amide monomer, (d) optionally at least one second polysiloxane vinylic crosslinker having 0 to 35 fourth H-donor moieties, and (e) at least one free radical initiator, wherein the first and second polysiloxane vinylic crosslinker are different from each other, wherein the first, second, third and fourth H-donor moieties independent of one another are hydroxyl groups, carboxyl groups, amino groups of —$NHR°$, amino linkages of —NH—, amide linkages of —CONH—, urethane linkages of —OCONH—, or combinations thereof, wherein $R°$ is H or a $C_1$-$C_4$ alkyl, wherein the polymerizable composition comprises at least 8.8 mmoles of component (c) per gram of all components (a), (b) and (d) in total and at least 0.11 meqs of the first, second, third and fourth H-donor moieties in total per gram of component (c); introducing the polymerizable composition into a lens mold; curing thermally or actinically the polymerizable composition in the lens mold to form a silicone hydrogel contact lens, wherein the silicone hydrogel contact lens has an oxygen permeability of at least 50 barrers, an elastic modulus of from about 0.2 MPa to about 1.5 MPa, and an equilibrium water content of from about 40% to about 70% and is inherently wettable as characterized by having a water-break-up-time of at least 10 seconds and a water contact angle by captive bubble of about 80 degrees or less without being subjected to any post-curing surface treatment.

These and other aspects of the invention will become apparent from the following description of the presently preferred embodiments. The detailed description is merely illustrative of the invention and does not limit the scope of the invention, which is defined by the appended claims and equivalents thereof.

BRIEF DESCRIPTION OF DRAWINGS

FIG. 1 schematically shows how to measure water-break-up time of a contact lens.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

A "soft contact lens" refers to a contact lens which has an elastic modulus (i.e., Young's modulus) of less than 2.5 MPa.

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "room temperature" refers to a temperature of about 21° C. to about 27° C.

The term "soluble", in reference to a compound or material in a solvent, means that the compound or material can be dissolved in the solvent to give a solution with a concentration of at least about 0.02% by weight at room temperature.

The term "insoluble", in reference to a compound or material in a solvent, means that the compound or material can be dissolved in the solvent to give a solution with a concentration of less than 0.005% by weight at room temperature.

As used in this application, the term "ethylenically unsaturated group" is employed herein in a broad sense and is intended to encompass any groups containing at least one >C=C< group. Exemplary ethylenically unsaturated groups include without limitation (meth)acryloyl

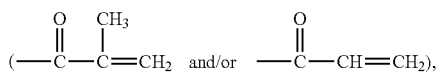

allyl, vinyl, styrenyl, or other C=C containing groups.

The term "terminal (meth)acryloyl group" refers to one (meth)acryloyl group at one of the two ends of the main chain (or backbone) of an organic compound as known to a person skilled in the art.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "blending vinylic monomer" refers to a vinylic monomer capable of dissolving both hydrophilic and hydrophobic components of a polymerizable composition to form a solution.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer that contains ethylenically unsaturated groups and has a number average molecular weight of greater than 700 Daltons.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

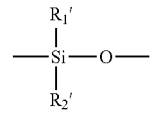

in which $R_1'$ and $R_2'$ are two substituents independently selected from the group consisting of $C_1$-$C_{10}$ alkyl, $C_1$-$C_4$ alkyl- or $C_1$-$C_4$— alkoxy-substituted phenyl, $C_1$-$C_{10}$ fluoroalkyl, $C_1$-$C_{10}$ fluoroether, $C_6$-$C_1$ aryl radical, -alk-(OC$_2$H$_4$)$_{\gamma 1}$—OR° (in which alk is $C_1$-$C_6$ alkyl diradical, R° is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3'$R$_4'$, amino linkages of —NR$_3'$—, amide linkages of —CONR$_3'$—, amide of —CONR$_3'$R$_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in Example 1 of U.S. Pat. Appl. Pub. No. 2012-0026457 A1. Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

"Ophthalmically compatible", as used herein, refers to a material or surface of a material which may be in intimate contact with the ocular environment for an extended period of time without significantly damaging the ocular environment and without significant user discomfort.

The term "modulus" or "elastic modulus" in reference to a contact lens or a material means the tensile modulus or Young's modulus which is a measure of the stiffness of a contact lens or a material. A person skilled in the art knows well how to determine the elastic modulus of a silicone hydrogel material or a contact lens. For example, all commercial contact lenses have reported values of elastic modulus. It can be measured as described in Example 1.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula $$UVA\ \%\ T = \frac{\text{Average \% Transmission between 315 nm and 380 nm}}{\text{Luminescence \% } T} \times 100$$

$$UVB\ \%\ T = \frac{\text{Average \% Transmission between 280 nm and 315 nm}}{\text{Luminescence \% } T} \times 100$$

$$\text{Violet} \%\ T = \frac{\text{Average \% Transmission between 380 nm and 440 nm}}{\text{Luminescence \% } T} \times 100$$

in which Luminescence % T is determined by the following formula $$\text{Luminescence \% } T = \text{Average \% Transmission between 780-380 nm.}$$

An "H-donor moiety" refers to a functional group which comprises a hydrogen atom capable of forming a hydrogen bond with another functional group. Examples of H-donor moieties include without limitation hydroxyl group, amide group of —CONHR°, amide linkage of —CONH—, urethane linkage of —OCONH—, urea linkage of —HNCONH—, carboxyl group of —COOH, amino groups of —NHR°, amino linkages of —NH—, and combinations thereof, wherein R° is H or a $C_1$-$C_4$ alkyl.

The term "inherently wettable" in reference to a silicone hydrogel contact lens means that the silicone hydrogel has water-break-up-time (WBUT) of about 10 seconds or more and a water contact angle by captive bubble ($WCA_{cb}$) of about 80 degree or less without being subjected to any surface treatment after the silicone hydrogel contact lens is formed by thermally or actinically polymerizing (i.e., curing) a silicone hydrogel lens formulation. In accordance with the invention, WBUT and $WCA_{cb}$ are measured according to the procedures described in Example 1.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Pat. Appl. Pub. Nos. 2011-0134387 A1, 2012-0026457 A1 and 2013-0118127 A1.

"Post-curing surface treatment", in reference to a silicone hydrogel bulk material or a SiHy contact lens, means a surface treatment process that is performed after the silicone hydrogel bulk material or the SiHy contact lens is formed by curing (i.e., thermally or actinically polymerizing) a SiHy lens formulation. A "SiHy lens formulation" refers to a polymerizable composition that comprises all necessary polymerizable components for producing a SiHy contact lens or a SiHy lens bulk material as well known to a person skilled in the art.

The invention is generally related to inherently-wettable SiHy contact lenses with a relatively high oxygen permeability, a desired water content (e.g., from about 40% to about 70% by weight), and a relatively low elastic modulus (e.g., from about 0.2 MPa to about 1.5 MPa). This invention is partly based on the surprise discovery that inherently-wettable SiHy contact lenses can be formed from a SiHy lens formulation (i.e., a polymerizable composition) that comprises a polysiloxane vinylic crosslinker ("Di-PDMS") having H-donor moieties ("H-D"), a siloxane-containing vinylic monomer ("mono-PDMS") with or without H-donor moieties, a N-vinyl amide monomer ("NVA") (e.g., N-vinylpyrrolidone, N-vinyl-N-methyl acetamide, or the like), and optionally other silicone-containing polymerizable component(s) with or without H-donor moieties, provided that the SiHy lens formulation comprise about 8.8 mmoles or more of all N-vinyl amide monomer(s) ("NVA") per gram of all the silicone-containing polymerizable components $$\left(\text{i.e., } \frac{[NVA] \text{ mmole}}{([mono-PDMS] + [Di-PDMS])\text{g}} = 8.8 \text{ mmole/g}\right)$$

and about 0.11 milliequivalents ("meq") or more of the H-donor moieties per gram of all N-vinyl amide monomer(s)

$$\left(\left(\text{i.e., } \frac{[H-D] \text{ meq}}{[NVA]\text{g}} = 0.11 \text{ meq/g}\right)\right),$$

which are contributed from the polysiloxane vinylic crosslinker and the siloxane containing vinylic monomer, per gram of the N-vinyl amide monomer. The resultant SiHy lenses not only can be inherently wettable, but also can have a combination of the desired contact lens properties including relatively high oxygen permeability, relatively high water content, relatively low modulus, and relatively-low surface atomic Si percentage.

The invention, in one aspect, provides a silicone hydrogel contact lens, comprising a silicone hydrogel bulk material which comprises (1) first repeating units of at least one siloxane-containing vinylic monomer including 0 to 10 first H-donor moieties, (2) second repeating units of at least one first polysiloxane vinylic crosslinker which has a number average molecular weight of from about 3000 Daltons to about 80,000 Daltons and comprises (a) two terminal (meth) acryloyl groups, (b) at least one polysiloxane segment comprising dimethylsiloxane units and hydrophilized siloxane units each having one methyl substituent and one monovalent $C_4$-$C_{40}$ organic radical substituent having one or more second H-donor moieties, and (c) from 0 to 20 third H-donor moieties which are integral parts of molecular structures outside of the polysiloxane segment, (3) third repeating units of at least one hydrophilic N-vinyl amide monomer, and (4) optionally fourth repeating units of at least one second polysiloxane vinylic crosslinker having 0 to 35 fourth H-donor moieties, wherein the first and second polysiloxane vinylic crosslinkers are different from each other, wherein the first, second, third and fourth H-donor moieties independent of one another are hydroxyl groups, carboxyl groups, amino groups of —NHR° in which R° is H or a $C_1$-$C_4$ alkyl, amino linkages of —NH—, amide linkages of —CONH—, urethane linkages of —OCONH—, or combinations thereof, wherein the silicone hydrogel bulk material comprises at least 8.8 (preferably at least 9.0, more preferably at least 9.2, even more preferably at least 9.6) mmoles of the third repeating units per gram of all the first, second and fourth repeating units in total and at least 0.11 (preferably at least 0.15, more preferably at least 0.20, even more preferably at least 0.25) meqs of all the first, second, third and fourth H-donor moieties in total per gram of the third repeating units, wherein the silicone hydrogel contact lens has an oxygen permeability of at least 50 barrers, an elastic modulus of from about 0.2 MPa to about 1.5 MPa, and an equilibrium water content of from about 40% to about 70% and is inherently wettable as characterized by having a water-break-up-time of at least 10 seconds (preferably at least 15 seconds, more preferably at least 20 seconds) and a water contact angle by captive bubble of about 80 degrees or less (preferably about 75 degrees or less, more preferably about 70 degrees or less, even more preferably about 65 degrees or less) without being subjected to any post-curing surface treatment.

In accordance with the invention, the amounts (weight, mmole, and meq) of the first, second, third and fourth repeating units as well as the H-donor moieties are calculated based on the amounts of said at least one siloxane-containing vinylic monomer, said at least one first polysiloxane vinylic crosslinker, said at least one N-vinyl amide monomer and said at least one second polysiloxane vinylic crosslinker present in a polymerizable composition for making a silicone hydrogel contact lens of the invention. It should be understood that if any pre-formed homopolymer or copolymer of an N-vinyl amide monomer is present in the polymerizable composition prior to cast molding, then the repeating units of such an N-vinyl amide monomer in the preformed homopolymer or copolymer must not be included in the calculations of the amounts (weight, mmole, and meq) of the first, second, third and fourth repeating units as well as the H-donor moieties.

Any suitable siloxane-containing vinylic monomers can be used in the invention. One class of preferred siloxane containing vinylic monomers is mono-(meth)acryloyl-terminated, monoalkyl-terminated polysiloxanes. In a more preferred embodiment, the siloxane-containing vinylic monomer is a mono-(meth)acryloyl-terminated, monoalkyl-terminated polysiloxane of formula (I)

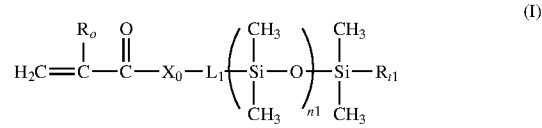

in which:
$R_o$ is H or methyl; $X_o$ is O or $NR_1$; $L_1$ is a $C_3$-$C_8$ alkylene divalent radical or a divalent radical of

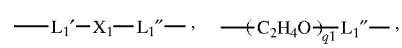

-continued

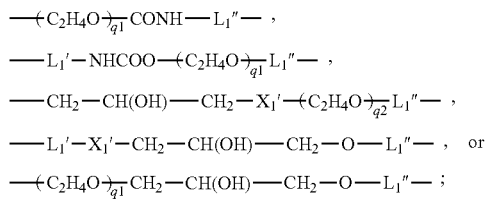

$L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ is a $C_1$-$C_4$ alkyl; $X_1'$ is O or $NR_1$; q1 is an integer of 1 to 20; q2 is an integer of 0 to 20; n1 is an integer of 3 to 25.

Examples of mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxybutylamino-2-hydroxypropyloxypropyl]-terminated ω-butyl (or ω-methyl) terminated polydimethylsiloxane, α-(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated w-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or w-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutylsilane) (meth) acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, and mixtures thereof. Mono-(meth)acryloyl-terminated, monoalkyl-terminated polysiloxanes of formula (I) can be obtained from commercial suppliers (e.g., Shin-Etsu, Gelest, etc.) or prepared according to procedures described in U.S. Pat. Nos. 6,867,245, 8,415,405, 8,475,529, 8,614,261, and 9,217,813 or by reacting a hydroxyalkyl (meth)acrylate or (meth)acrylamide or a (meth)acryloxy-polyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, ob by reacting isocyanatoethyl (meth)acrylate with a mono-carbinol-terminated polydimethylsiloxane according to coupling reactions well known to a person skilled in the art.

Another class of preferred siloxane containing vinylic monomers is vinylic monomers containing a tris(trimethylsilyloxy)silyl or bis(trimethylsilyloxy)alkylsilyl group (i.e., tris(trimethylsilyloxy)silyl-containing vinylic monomer or bis(trimethylsilyloxy)alkylsilyl-containing vinylic monomer. In a more preferred embodiment, the siloxane-containing vinylic monomer is a tris(trimethylsilyloxy)silyl-containing or bis(trimethylsilyloxy)alkylsilyl-containing vinylic monomer of formula (II)

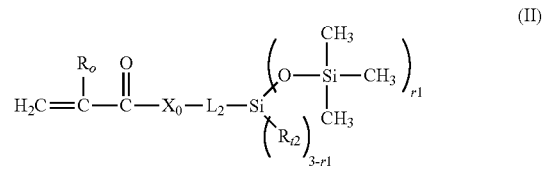

in which: $R_o$ is H or methyl; $X_o$ is O or $NR_1$; $L_2$ is a $C_3$-$C_8$ alkylene divalent radical or a divalent radical of or -$L_2'$-$X_2$-$L_2''$-, —$(C_2H_4O)_{q1}$-$L_2''$-, —$(C_2H_4O)_{q1}$—CONH-$L_2''$-; or -$L_2'$-NHCOO—$(C_2H_4O)_{q1}$-$L_2''$-, $L_2'$ is a $C_2$-$C_8$ alkylene divalent radical which has zero or one hydroxyl group; $L_2''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t2}$ is a $C_1$-$C_4$ alkyl; q1 is an integer of 1 to 20, r1 is an integer of 2 or 3.

Examples of preferred siloxane-containing vinylic monomers of formula (II) include without limitation tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, and mixtures thereof. Preferred siloxane-containing vinylic monomers of formula (II) can be obtained from commercial suppliers or can be prepared according to procedures described in U.S. Pat. Nos. 7,214,809, 8,475,529, 8,658,748, 9,097,840, 9,103,965, and 9,475,827.

In accordance with the present invention, the siloxane-containing vinylic monomer is a mono-(meth)acryloyl-terminated monoalkyl-terminated polysiloxane, a bis(trimethylsilyloxy)-alkylsilyl-containing vinylic monomer, tris(trimethylsilyloxy)silyl-containing vinylic monomer, or mixtures thereof, preferably a mono-(meth)acryloyl-terminated monoalkyl-terminated polysiloxane, a bis(trimethylsilyloxy)alkylsilyl-containing vinylic monomer or combinations thereof, more preferably a mono-(meth)acryloyl-terminated monoalkyl-terminated polysiloxane having a weight-average molecular weight of about 2500 Daltons or less (preferably about 2000 Daltons or less, more preferably about 1700 Daltons or less, even more preferably from about 450 to about 1500 Daltons) of formula (I), even more preferably more preferably a mono-(meth)acryloyl-terminated monoalkyl-terminated polysiloxane of formula (I) in which n1 is an integer of 3 to 25 (preferably 3 to 20, more preferably 3 to 15, even more preferably 3 to 10).

It is understood that by having at least one H-donor moiety, the siloxane-containing vinylic monomer can be more compatible with hydrophilic N-vinyl amide monomer compared to one without any H-donor moiety.

In accordance with the invention, any polysiloxane vinylic crosslinker can be used in the invention as the first polysiloxane vinylic crosslinker, so long as it comprises hydrophilized siloxane units each having one methyl substituent and one monovalent $C_4$-$C_{40}$ organic radical substituent having at least two hydroxyl groups and optional other H-donor moieties and has a number average molecular weight of from about 3000 Daltons to about 80,000 Daltons (preferably from about 4000 to about 40000 Daltons, more preferably from about 5000 to about 20000 Daltons).

While not wishing to be bound by any theory, the inventors believe that such a polysiloxane vinylic crosslinker having hydrophilized siloxane units play important roles in having high oxygen permeability and low modulus while maintaining the integrity of the contact lens during handling. Where a polysiloxane vinylic crosslinker without H-donor moieties or hydrophilic moieties has a number average molecular weight too low, the modulus of resultant SiHy lenses would be too high. However, where a polysiloxane vinylic crosslinker without H-donor moieties or hydrophilic moieties has a high number average molecular weight, it is not sufficiently compatible with N-vinyl amide monomer or other hydrophilic polymerizable component and could cause haziness to resultant SiHy contact lenses. With an adequate number of H-donor moieties, a high molecular weight polysiloxane vinylic crosslinker would be sufficiently compatible with N-vinyl amide monomer and other hydrophilic polymerizable components. In addition, it is believed that due to the presence of those H-donor moieties, N-vinyl amide monomer molecules may be preferentially located in the vicinities of such a high molecular weight polysiloxane vinylic crosslinker because of hydrogen bonding between N-vinyl amide monomer and the H-donor moieties. During the polymerization, in-situ generated poly(N-vinylamide) may preferentially form inter-penetrating network with hydrophobic silicone regions and would therefore facilitate the formation of a silicone hydrogel with a macroscopic homogeneity but a microscopic heterogeneity (i.e., microscopic phase separation) for having minimized haziness, high oxygen permeability and high water content.

Preferably, the first polysiloxane vinylic crosslinker comprises: (1) a polysiloxane segment comprising dimethylsiloxane units and hydrophilized siloxane units each having one methyl substituent and one monovalent $C_4$-$C_{40}$ organic radical substituent having 2 to 6 H-donor moieties, wherein the molar ratio of the hydrophilized siloxane units to the dimethylsiloxane units is from about 0.035 to about 0.15; (2) two terminal (meth)acryloyl groups; and (3) from 0 to 20 third H-donor moieties, wherein the polysiloxane vinylic crosslinker has a number average molecular weight of from about 3000 Daltons to about 80,000 Daltons.

More preferably, the first polysiloxane vinylic crosslinker is a compound of formula (1)

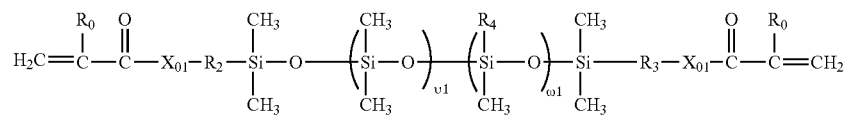

in which:

υ1 is an integer of from 30 to 500 and ω1 is an integer of from 1 to 75, provided that ω1/υ1 is from about 0.035 to about 0.15 (preferably from about 0.040 to about 0.12, even more preferably from about 0.045 to about 0.10);

$X_{01}$ is O or $NR_n$ in which $R_n$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (6)

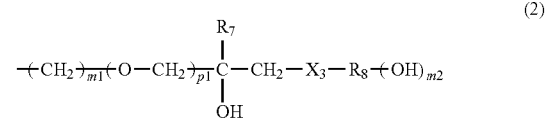

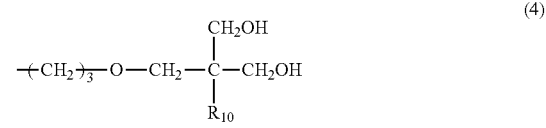

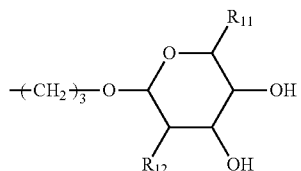

(5)

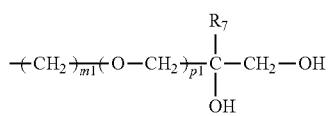

(6)

p1 is zero or 1; m1 is an integer of 2 to 4; m2 is an integer of 1 to 5; m3 is an integer of 3 to 6; m4 is an integer of 2 to 5;

$R_7$ is hydrogen or methyl;

$R_8$ is a $C_2$-$C_5$ hydrocarbon radical having (m2+1) valencies;

$R_9$ is a $C_2$-$C_5$ hydrocarbon radical having (m4+1) valencies;

$R_{10}$ is ethyl or hydroxymethyl;

$R_{11}$ is methyl or hydromethyl;

$R_{12}$ is hydroxyl or methoxy;

$X_3$ is a sulfur linkage of —S— or a teriary amino linkage of —$NR_{13}$— in which $R_{13}$ is $C_1$-$C_1$ alkyl, hydroxyethyl, hydroxypropyl, or 2,3-dihydroxypropyl; and $X_4$ is an amide linkage of

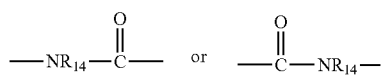

in which $R_{14}$ is hydrogen or $C_1$-$C_{10}$ alkyl.

In a preferred embodiment, $R_4$ is a monovalent radical of one of formula (2a) to (2y).

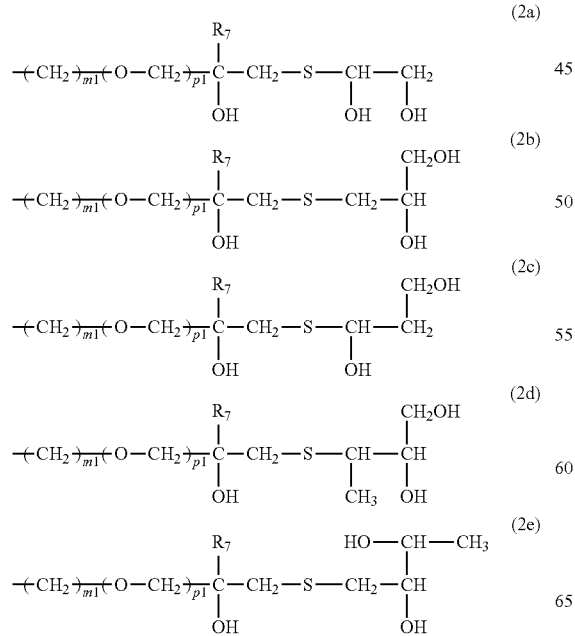

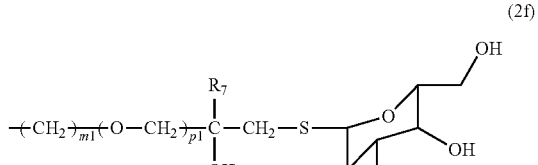

(2f)

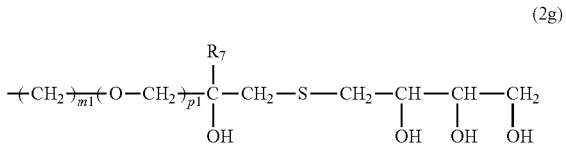

(2g)

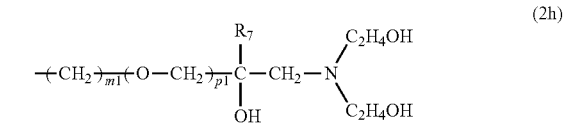

(2h)

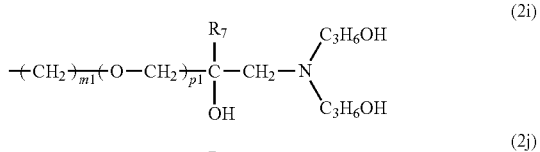

(2i)

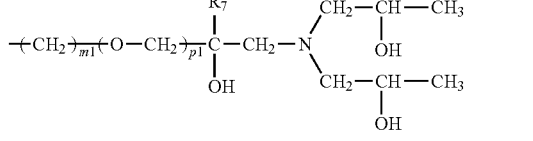

(2j)

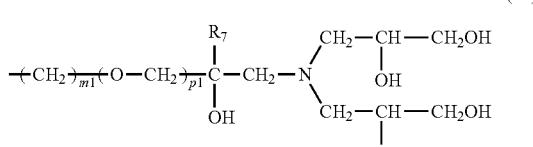

(2k)

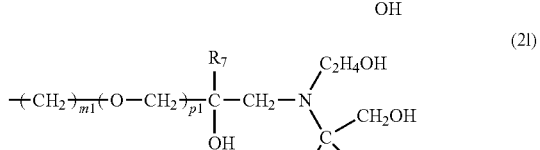

(2l)

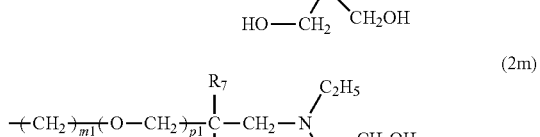

(2m)

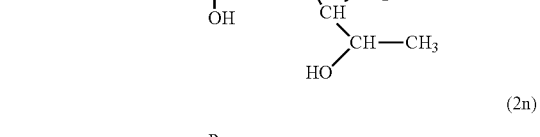

(2n)

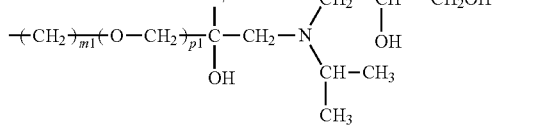

(2o)

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH_3}{\overset{CH_2\text{—}CH\text{—}CH_2OH}{\diagdown}}_{\underset{OH}{|}} \tag{2p}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH\text{—}CH\text{—}CH_2}{\overset{CH_3}{\diagdown}}_{\underset{OH}{|}\ \underset{OH}{|}\ \underset{OH}{|}} \tag{2q}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH_3}{\overset{C_2H_4\text{—}CH\text{—}CH_2OH}{\diagdown}}_{\underset{OH}{|}} \tag{2r}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{\underset{H_2C\text{—}OH}{|}}{\overset{CH_3}{\diagdown}}\text{CH}\text{—}C_2H_4OH \tag{2s}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH\text{—}CH_2\text{—}CH\text{—}CH_3}{\overset{CH_3}{\diagdown}}_{\underset{OH}{|}\quad\underset{OH}{|}} \tag{2t}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH_2\text{—}CH\text{—}CH_2}{\overset{CH_3}{\diagdown}}_{\underset{OH}{|}\ \underset{OH}{|}\ \underset{OH}{|}} \tag{2u}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH_2\text{—}(CH)_3\text{—}CH_2}{\overset{CH_3}{\diagdown}}_{\underset{OH}{|}\ \underset{OH}{|}} \tag{2v}$$

$$\text{—}(CH_2)_{\overline{m1}}\text{—}O\text{—}CH_2\text{—}\underset{\underset{OH}{|}}{\overset{\overset{R_7}{|}}{C}}\text{—}CH_2\text{—}N\underset{CH_2\text{—}(CH)_4\text{—}CH_2}{\overset{CH_3}{\diagdown}}_{\underset{OH}{|}\ \underset{OH}{|}} \tag{2w}$$

(2x) — pyranose-linked structure with $R_7$, $CH_3$, $N$ and sugar ring bearing OH, HO, HO, CH$_2$OH (2y) — structure with $C_2H_5$ substituent on N and sugar ring bearing OH, HO, HO, CH$_2$OH in which p1 is zero or 1 (preferably 1), m1 is an integer of 2 to 4 (preferably 3), $R_7$ is hydrogen or methyl (preferably hydrogen).

In another preferred embodiment, $R_4$ a monovalent radical of one of formula (3a) to (3y).

$$\text{—}(CH_2)_{\overline{3}}\text{—}X_4\text{—}CH\text{—}CH_2 \atop \underset{OH}{|}\ \underset{OH}{|} \tag{3a}$$

$$\text{—}(CH_2)_{\overline{3}}\text{—}X_4\text{—}CH_2\text{—}CH\text{—}CH_2 \atop \underset{OH}{|}\ \underset{OH}{|} \tag{3b}$$

$$\text{—}(CH_2)_{\overline{3}}\text{—}X_4\text{—}CH\text{—}CH_2OH \atop \underset{CH_2OH}{|} \tag{3c}$$

$$\text{—}(CH_2)_{\overline{3}}\text{—}X_4\text{—}CH\text{—}CH\text{—}CH_3 \atop \underset{OH}{|}\ \underset{OH}{|} \tag{3d}$$

$$\text{—}(CH_2)_{\overline{3}}\text{—}X_4\text{—}CH\text{—}CH\text{—}CH_2 \atop \underset{OH}{|}\ \underset{OH}{|}\ \underset{OH}{|} \tag{3e}$$

$$\text{—}(CH_2)_{\overline{3}}\text{—}X_4\text{—}CH\text{—}CH_2\text{—}CH\text{—}CH_2 \atop \underset{OH}{|}\quad\underset{OH}{|}\ \underset{OH}{|} \tag{3f}$$

$$\text{—}(CH_2)_{\overline{3}}\text{—}X_4\text{—}\underset{\underset{CH}{|}}{\overset{\overset{CH_2OH}{|}}{C}}\text{—}CH_2\text{—}CH\text{—}CH_2 \atop \underset{OH}{|}\ \underset{OH}{|} \tag{3g}$$

$$\text{—}(CH_2)_{\overline{3}}\text{—}X_4\text{—}CH\text{—}\overset{\overset{OH}{|}}{CH}\text{—}CH\text{—}CH_2 \atop \underset{OCH_3}{|}\quad\underset{OH}{|}\ \underset{OH}{|} \tag{3h}$$

$$\text{—}(CH_2)_{\overline{3}}\text{—}X_4\text{—}\overset{\overset{CH_2OH}{|}}{CH}\text{—}CH_2\text{—}CH_2 \atop \underset{OH}{|} \tag{3i}$$

$$\text{—}(CH_2)_{\overline{3}}\text{—}X_4\text{—}CH\text{—}\overset{\overset{OH}{|}}{CH}\text{—}CH_3 \atop \underset{CH_2OH}{|} \tag{3j}$$

$$\text{—}(CH_2)_{\overline{3}}\text{—}X_4\text{—}CH_2\text{—}CH_2\text{—}CH\text{—}CH_2 \atop \underset{OH}{|}\ \underset{OH}{|} \tag{3k}$$

$$\text{—}(CH_2)_{\overline{3}}\text{—}X_4\text{—}CH\text{—}CH\text{—}CH\text{—}CH_2 \atop \underset{OH}{|}\ \underset{OH}{|}\ \underset{OH}{|}\ \underset{OH}{|} \tag{3l}$$

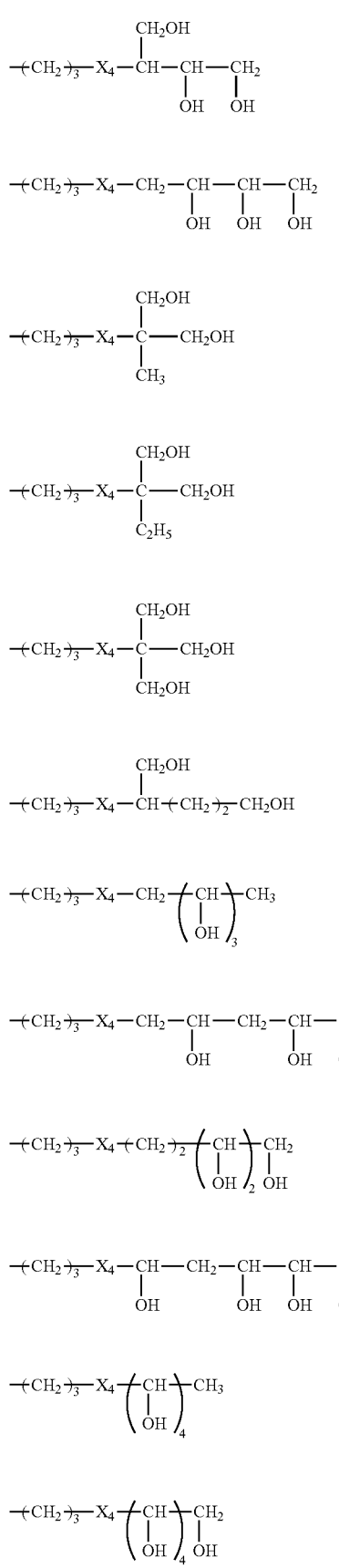

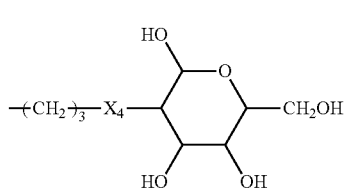

in which $X_4$ is an amide linkage of

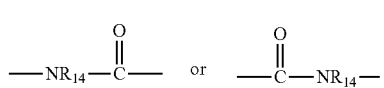

in which $R_{14}$ is hydrogen or $C_1$-$C_{10}$ alkyl.

In another preferred embodiment, $R_4$ is a monovalent radical of formula (4a) or (4b).

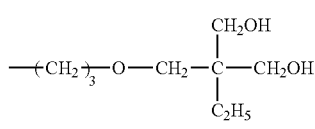

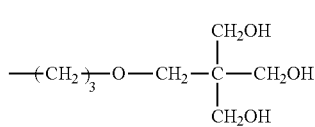

In another preferred embodiment, $R_4$ a monovalent radical of one of formula (5a) to (5c).

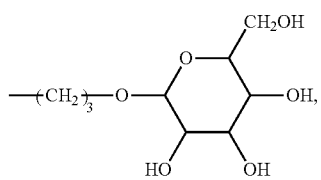

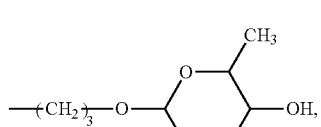

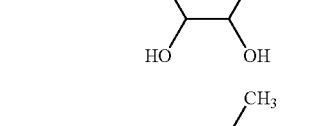

In another preferred embodiment, the monovalent radical $R_4$ is a radical of formula (6) in which m1 is 3, p1 is 1, and $R_7$ is hydrogen. Such a preferred first polysiloxane vinylic crosslinker is represented by formula (A)

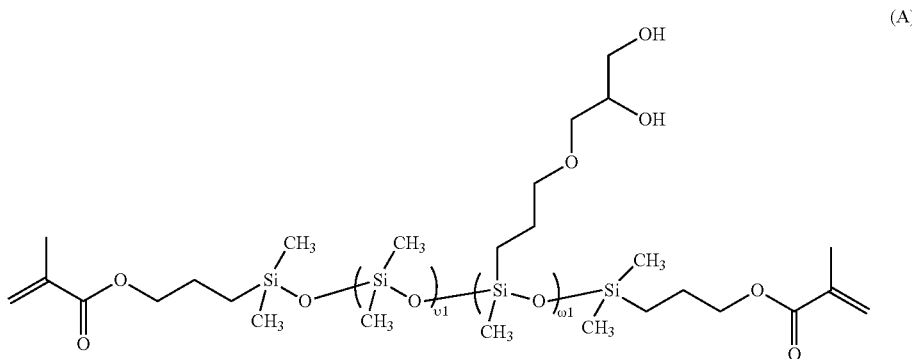

(A)

in which υ1 and ω1 are as defined above.

A polysiloxane vinylic crosslinker of formula (1) can be prepared by reacting a hydrosiloxane-containing polysiloxane of formula (7) with an ene monomer containing 2 to 5 hydroxyl group

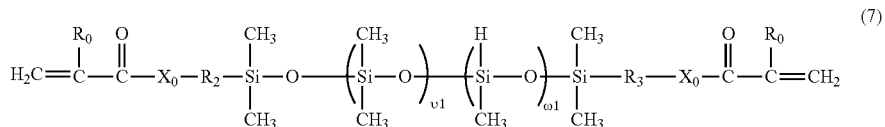

(7)

in which $X_0$, $R_0$, $R_2$, $R_3$, υ1, and ω1 are as defined above, in a platinum-catalyzed hydrosilylation reaction as known to a person skilled in the art.

Hydrosiloxane-containing polysiloxane of formula (7) can be prepared according to any methods known to a person skilled in the art. As an illustrative example, a hydrosiloxane-containing polysiloxane of formula (7) can be prepared from polymerization of a mixture of octamethylcyclotetrasiloxane (D4) and 1,3,5,7-tetramethylcyclotetrasiloxane (H4) in presence of 1,3-bis[3-(meth)acryloxypropyl] tetramethyldisiloxane as a chain end block and in the presence of a catalyst. By controlling the molar ratio of D4 to H4, a desired value of υ1/ω1 can be obtained.

Where in formula (1) $R_4$ is a monovalent radical of formula (4), (5) or (6), the ene monomer preferred is 3-allyoxy-1,2-propanediol, 2-allyloxymethyl-2-(hydroxymethyl)-1,3-propanediol, 2-allyloxymethyl-2-ethyl-1,3-propanediol (i.e., trimethylolpropaneallylether), allyl α-D-mannopyranoside, allyl α-D-galactopyranoside, allyl 6-deoxyhexopyranoside, allyl 6-deoxy-2-O-methylhexopyranoside, or a fully-hydrolized (i.e., ring-opening) product of an epoxy-containing ene monomer which is allyloxy glycidyl ether, 1,2-epoxy-5-hexene, 3,4-epoxy-1-butene, or 2-methyl-2-vinyloxirane. The above-listed ene monomers are commercially available.

Where in formula (1) $R_4$ is a monovalent radical of formula (2), the ene monomer preferred is a reaction product of an epoxy-containing ene monomer with a mercaptan having 2 to 5 hydroxyl groups or a secondary amine having 2 to 5 hydroxyl groups. Examples of commercially available epoxy-containing ene monomers include without limitation allyloxy glycidyl ether, 1,2-epoxy-5-hexene, 3,4-epoxy-1-butene, and 2-methyl-2-vinyloxirane. Examples of commercially available mercaptans having 2 to 4 hydroxyl groups include without limitation 1-mercaptoethane-1,2-diol, 2-mercaptopropane-1,3-diol, 3-mercaptopropane-1,2-diol, 3-mercaptobutane-1,2-diol, 1-mercaptobutane-2,3-diol, 4-mercapto-1,2,3-butanetriol, and 2-mercapto-6-methyloltetrahydropyran-3,4,5-triol. Examples of commercially available secondary amines having 2 to 4 hydroxyl groups include without limitation bis(2-hydroxyethyl)amine, bis(2-hydroxypropyl)amine, bis(3-hydroxypropyl)amine, bis-(2,3-dihydroxypropyl)amine, isopropylamino-1,2-propanediol, 2-(2-hydroxethylamino)-2-(hydroxymethyl)-1,3-propanediol, 2-(ethylamino)-1,3-butanediol, 6-ethylamino-1,2,4-cyclohexanetriol, 3-(methylamino)-6-methylol-tetrahydropyrantriol, 3-(ethylamino)-6-methylol-tetrahydropyrantriol, 3-methylamino-1,2-propanediol, 2-methylamino-1,3-propanediol, 1-(Methylamino)-1,2,3-propanetriol, 4-methylamino-1,2-butanediol, 2-methylamino-1,4-butanediol, 2-methylamino-1,3-butanediol, N-methyl-2,3,4-trihydroxybutylamine, N-methyl-2,3,4,5-tetradroxypentylamine, N-methyl-2,3,4,5,6-pentadroxyhexylamine. Reactions between an epoxide and a mercaptan (to form a thiol ether linkage) and between an epoxide and a secondary amine (to form an amino linkage) are well known to a person skilled in the art and have been described in the literature.

Where in formula (1) $R_4$ is a monovalent radical of formula (3), the ene monomer preferred is a reaction product of either (1) a carboxy-containing ene monomer with a primary or secondary amine having 2 to 5 hydroxyl groups or (2) a primary amino-containing or secondary amino-containing ene monomer with an alkanoic acid having 2 to 5 hydroxyl groups, according to the well-known coupling reaction between one carboxylic acid group and one amino (primary or secondary) group in the presence of 1-ethyl-3-(3-dimethylaminopropyl) carbodiimide (EDC) and N-hydroxysuccinimide (HO—NHS), to obtain an ene monomer having 2 to 5 hydroxyl groups and an amide linkage. Examples of commercially available carboxy-containing ene monomers include without limitation 3-butenoic acid, 4-pentenoic acid, 5-hexenoic acid, and 6-heptenoic acid. Examples of commercially available primary or secondary amino-containing ene monomers include without limitation allylamine, 3-butenylamine, 4-pentenylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, and N-allyl-1-heptanamine. Examples of commercially available alkanoic acids having 2 to 5 hydroxyl groups include without limitation 2,3-dihydroxypropanoic acid, 2,3-dihydroxybutanoic acid, 3,4-dihydroxybutanoic acid, 2,3,4-trihydroxybutanoic acid, 2,4,5-trihydroxypentanoic acid, 2,4,5-trihydroxy-2-(hydroxymethyl)pentanoic acid, 3,4,5-trihydroxy-2-methoxypentanoic acid, xylonic acid (2,3,4,5-tetrahydroxypantanoic acid), 3,4,5-trihydroxyhexanoic acid, 3,5,6-trihydroxyhexanoic acid, 4,5,6-trihydroxyhexanoic acid, 2,4,5,6-tetrahydroxyhexanoic acid, 2,3,4,5-tetrahydroxyhexanoic acid, 2,3,4,5,6-pentahydroxyhexanoic acid. Examples of commercially available primary amines having 2 to 5 hydroxyl groups include without limitation dihydroxyethylamine, 2,3-dihydropropylamine, 2-amino-1,3-propanediol, 2-amino-1,4-butanediol, 2-amino-1,3-butanediol, 4-amino-1,2-butanediol, 2-amino-1,3,4-butanetriol, 4-amino-1,2,3-butanetriol, 2-amino-2-methyl-1,3-propanediol, 2-amino-2-ethyl-1,3-propanediol, 2-amino-2-(hydroxymethyl)-1,3-propanediol, 2-amino-1,5-pentanediol, and 3-amino-6-hydroxymethyl-tetrahydropyran-2,4,5-triol. The above-listed commercially-available secondary amines having 2 to 5 hydroxyl groups can be used in the reaction with a carboxy-containing ene monomer to obtain an ene monomer having multiple hydroxyl groups and an amide linkage. The reaction between a carboxylic acid group and a primary or secondary amino group to form an amide linkage is well known to a person skilled in the art and has been described extensively in the literature.

The procedures for preparing a polysiloxane vinylic crosslinkers of formula (1) have also been described in detail in U.S. Pat. Appl. Pub. No. 2017-0166673 A1.

It is understood that the fourth repeating units of at least one second polysiloxane vinylic crosslinkers are optional components. Any suitable polysiloxane vinylic crosslinkers other than those polysiloxane vinylic crosslinkers having hydrophilized siloxane units described above can be used in the inventions, so long as each of them comprises at least one polysiloxane segment and at least two ethylenically unsaturated groups. Examples of such polysiloxane vinylic crosslinkers are di-(meth)acryloyl-terminated polydimethylsiloxanes of various molecular weight; divinyl carbonate-terminated polydimethylsiloxanes; divinyl carbamate-terminated polydimethylsiloxane; divinyl terminated polydimethylsiloxanes of various molecular weight; di-(meth)acrylamido-terminated polydimethylsiloxanes; N,N,N',N'-tetrakis(3-methacryloxy-2-hydroxypropyl)-alpha,omega-bis-3-aminopropyl-polydimethylsiloxane; chain-extended polysiloxane vinylic crosslinkers which comprises at least two polysiloxane segments and at least one divalent organic radical linking each pair of adjacent polysiloxane segments and having one or more H-donor moieties (see, e.g., those disclosed in U.S. Pat. Nos. 5,034,461, 5,416,132, 5,449,729, 5,760,100, 7,423,074, 8,529,057, and 8,993,651 and in U.S. Pat. App. Pub. No. 2018-0100053 A1); siloxane-containing macromer selected from the group consisting of Macromer A, Macromer B, Macromer C, and Macromer D described in U.S. Pat. No. 5,760,100; the reaction products of glycidyl methacrylate with amino-functional polydimethylsiloxanes; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

Examples of preferred di-(meth)acryloyl-terminated polydiorganosiloxanes include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

In accordance with the invention, any suitable N-vinyl amide monomers can be used in the invention. Examples of preferred N-vinyl amide monomers include without limitation N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

In accordance with the invention, a silicone hydrogel contact lens of the invention can further comprise (but preferably comprises) repeating units of one or more non-silicone vinylic crosslinking agents, preferably in an amount of about 1.0% or less (preferably about 0.8% or less, more preferably from about 0.05% to about 0.6%) by weight relative to the dry weight of the silicone hydrogel contact lens. The amount of the repeating units of a non-silicone vinylic crosslinking agent can be calculated based on the amount of the non-silicone vinylic crosslinking agent in a polymerizable composition used for preparing the silicone hydrogel contact lens over the total amount of all polymerizable components in the polymerizable composition.

Examples of preferred non-silicone vinylic cross-linking agents include without limitation ethyleneglycol di-(meth) acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth) acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth) acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis (meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, or triallyl cyanurate.

In accordance with the invention, a silicone hydrogel contact lens of the invention preferably can further comprise repeating units of one or more blending vinylic monomers, preferably in an amount of about 25% or less by weight (preferably about 20% or less by weight, more preferably about 15% or less by weight, relative to the dry weight of the silicone hydrogel contact lens. The amount of the repeating units of a blending vinylic monomer can be calculated based on the amount of the blending vinylic monomer in a polymerizable composition used for preparing the silicone hydrogel contact lens over the total amount of all polymerizable components in the polymerizable composition.

Examples of preferred blending vinylic monomers include $C_1$-$C_{10}$ alkyl (meth)acrylate (e.g., methyl (meth) acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoroisopropyl (meth)acrylate, hexafluorobutyl (meth)acrylate, or combinations thereof. Preferably, methyl methacrylate is used as a blending vinylic monomer.

In accordance with a preferred embodiment of the invention, a silicone hydrogel contact lens of the invention can further comprise (but preferably comprises) repeating units of one or more UV-absorbing vinylic monomers and optionally (but preferably) one or more UV/HEVL-absorbing vinylic monomers. The term "UV/HEVL-absorbing vinylic monomer" refers to a vinylic monomer that can absorb UV light and high-energy-violet-light (i.e., light having wavelength between 380 nm and 440 nm.

Any suitable UV-absorbing vinylic monomers and UV/HEVL-absorbing vinylic monomers can be used in a polymerizable composition for preparing a polymer of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl) benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl] ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy] phenyl}-5-methoxy-2H-benzotriazole (UV13), 2-{2'-Hydroxy-3'-tert-butyl-5'-[3'-methacryloyloxypropoxy] phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5'-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

In a preferred embodiment, a silicone hydrogel contact lens of the invention comprises repeating units of a UV-absorbing vinylic monomer and repeating units of a UV/HEVL absorbing vinylic monomer. More preferably, the silicone hydrogel contact lens is characterized by having the UVB transmittance of about 10% or less (preferably about 5% or less, more preferably about 2.5% or less, even more preferably about 1% or less) between 280 and 315 nanometers and a UVA transmittance of about 30% or less (preferably about 20% or less, more preferably about 10% or less, even more preferably about 5% or less) between 315 and 380 nanometers and and a Violet transmittance of about 70% or less, preferably about 60% or less, more preferably about 50% or less, even more preferably about 40% or less) between 380 nm and 440 nm. Even more preferably, the UV-absorbing vinylic monomer is 2-[2'-hydroxy-5'-(2-methacryloxyethyl)phenyl)]-2H-benzotriazole (Norbloc), and the UV/HEVL absorbing vinylic monomer is 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), or combinations thereof.

In accordance with the invention, a silicone hydrogel contact lens of the invention can further comprise repeating units of one or more hydrophilic acrylic monomers, preferably in an amount of about 10% or less (preferably about 8% or less, more preferably about 5% or less) by weight relative to the dried weight of the silicone hydrogel contact lens. The amount of the repeating units of a hydrophilic acrylic monomer can be calculated based on the amount of the hydrophilic acrylic monomer in a polymerizable composition used for preparing the silicone hydrogel contact lens over the total amount of all polymerizable components in the polymerizable composition.

Examples of preferred hydrophilic acrylic monomers include without limitation N,N-dimethyl (meth)acrylamide, (meth)acrylamide, N-hydroxylethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth) acrylate having a number average molecular weight of up to 1500, N-[tris(hydroxymethyl)methyl]-acrylamide, (meth) acrylic acid, ethylacrylic acid, and combinations thereof. Preferably, the hydrophilic vinylic monomer is N,N-dimethyl (meth)acrylamide, hydroxyethyl (meth)acrylate, N-hydroxylethyl (meth)acrylamide, glycerol methacrylate (GMA), or combinations thereof.

A silicone hydrogel contact lens of the invention can also comprise other necessary components known to a person skilled in the art, such as, for example, one or more free radical initiator, a visibility tinting agent (e.g., repeating units of one or more polymerizable dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis (isobutyronitrile) (AIBN), 1,1-azodiisobutyramidine, 1,1'-azo-bis (1-cyclohexanecarbonitrile), 2,2'-azo-bis(2,4-dimethyl-valeronitrile) and the like.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators, which can be incorporated, for example, into a macromer or can be used as a special monomer, are also suitable. Examples of reactive photoinitiators are those disclosed in EP 632 329.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crossllinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number average molecular weight $M_w$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In a preferred embodiment, a silicone hydrogel contact lens of the invention comprises about 60% or more by weight (preferably about 65% or more by weight, more preferably about 70% or more by weight, even more preferably about 75% or more by weight) of the first, second, and third repeating units relative to the dry weight of the silicone hydrogel contact lens. The total amount of the first, second, and third repeating units can be calculated based on the sum of the amounts of the siloxane-containing vinylic monomer, the first polysiloxane vinylic crosslinker and the hydrophilic N-vinyl amide monomer in a polymerizable composition used for preparing the silicone hydrogel contact lens over the total amount of all polymerizable components in the polymerizable composition.

A silicone hydrogel contact lens of the invention can be prepared from a polymerizable composition (i.e., a lens-forming composition or a lens formulation) according to a method of the invention which is another aspect of the invention.

A polymerizable composition can be prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In another aspect, the present invention provides a method for producing inherently-wettable silicone hydrogel contact lenses. The method comprises the steps of: preparing a polymerizable composition which is clear at room temperature and optionally but preferably at a temperature of from about 0 to about 4° C., wherein the polymerizable composition comprises (a) at least one siloxane-containing vinylic monomer including 0 to 10 first H-donor moieties, (b) at least one first polysiloxane vinylic crosslinker which has (iv) a number average molecular weight of from about 3000 Daltons to about 80,000 Daltons and comprises (i) two terminal (meth)acryloyl groups, (ii) at least one polysiloxane segment comprising dimethylsiloxane units and hydrophilized siloxane units each having one methyl substituent and one monovalent $C_4$-$C_{40}$ organic radical substituent having one or more second H-donor moieties, and (iii) from 0 to 20 third H-donor moieties which are integral parts of molecular structures outside of the polysiloxane segment, (c) at least one hydrophilic N-vinyl amide monomer, (d) optionally at least one second polysiloxane vinylic crosslinker having 0 to 35 fourth H-donor moieties, and (e) at least one free radical initiator, wherein the first and second polysiloxane vinylic crosslinker are different from each other, wherein the first, second, third and fourth H-donor moieties independent of one another are hydroxyl groups, carboxyl groups, amino groups of —NHR°, amino linkages of —NH—, amide linkages of —CONH—, urethane linkages of —OCONH—, or combinations thereof, wherein R° is H or a $C_1$-$C_4$ alkyl, wherein the polymerizable composition comprises at least 8.8 (preferably at least 9.0, more preferably at least 9.2, even more preferably at least 9.6) mmoles of component (c) per gram of all components (a), (b) and (d) in in total and at least 0.11 (preferably at least 0.15, more preferably at least 0.20, even more preferably at least 0.25) meqs of the first, second, third and fourth H-donor moieties in total per gram of component (c); introducing the polymerizable composition into a lens mold; curing thermally or actinically the polymerizable composition in the lens mold to form a silicone hydrogel contact lens, wherein the silicone hydrogel contact lens has an oxygen permeability of at least 50 barrers, an elastic modulus of from about 0.2 MPa to about 1.5 MPa, and an equilibrium water content of from about 40% to about 70% and is inherently wettable as characterized by having a water-break-up-time of at least 10 seconds and a water contact angle by captive bubble of about 80 degrees or less without being subjected to any post-curing surface treatment.

Various embodiments described above of siloxane-containing vinylic monomers, polysiloxane vinylic crosslinkers, hydrophilic N-vinyl amide monomers, non-silicone vinylic crosslinking agents, blending vinylic monomers, UV-absorbing vinylic monomers, hydrophilic vinylic monomers, free radical initiators, visibility-tinting agents, and solvents should be incorporated into this aspect of the invention.

In a preferred embodiment, a polymerizable composition of the invention comprises about 60% or more by weight (preferably about 65% or more by weight, more preferably about 70% or more by weight, even more preferably about 75% or more by weight) of all components (a), (b) and (c) in total relative to the total weight of all polymerizable components in the polymerizable composition.

The thermal polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those solvent described above. After extraction, lenses can be hydrated in water or an aqueous solution of a wetting agent (e.g., a hydrophilic polymer).

The molded contact lenses can further subject to further processes, such as, for example, hydration, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_i$ or $Dk_c$) of a lens and a lens material are determined according to procedures described in Example 1 of U.S. Pat. Appl. Pub. No. 2012-0026457 A1.

Surface Wettability Tests

Water contact angle (WCA) on a contact lens is a general measure of the surface wettability of a contact lens. In particular, a low water contact angle corresponds to more wettable surface. The dynamic captive bubble contact angles of contact lenses are measured using a FDS instrument device from FDS Future Digital Scientific Corp. The FDS equipment is capable of measuring the advancing and receding contact angles. The measurement is performed on hydrated contact lenses at room temperature. A contact lens is removed from the vial and soaked in ~40 mL fresh phosphate buffered saline (PBS) and shake for at least 30 minutes, then replace with fresh PBS, soak and shake for another 30 minutes unless otherwise specified. The contact lens is then put on a lens paper and dabbed to remove surface water prior to be placed on top of a lens holder with front curve up then screw the lens holder top on. Place the secure lens holder into the glass cell cuvette filled with filtered PBS. Place the glass cell cuvette onto the stage of the FDS instrument. Adjust the stage height and the syringe needle to dispense the air bubble to the lens surface. Repeat dispense/withdrawal 3 cycles for every lens to get the advancing and receding contact angles. The receding contact angles are reported in the examples below.

Water Break-Up Time (WBUT) Tests

The surface hydrophilicity of lenses (after autoclave) is assessed by determining the time required for the water film to start breaking on the lens surface. Lenses exhibiting WBUT≥10 seconds are considered to have a hydrophilic surface and are expected to exhibit adequate wettability (ability to support the tear film) on-eye.

Lenses are prepared for water breakup measurement by removing the lens from its blister with soft plastic tweezers (Menicon) and placing the lens in a beaker containing phosphate buffered saline. The beaker contains at least 20 mL phosphate buffered saline per lens, with up to 3 lenses per beaker. Lenses are soaked for a minimum 30 minutes up to 24 hours before being transferred with soft plastic tweezers into a 96 well plastic tray with fresh phosphate buffered saline.

Water breakup time is measured at room temperature as follows: lenses are picked up with soft plastic tweezers as close to the edge of the lens as possible, base curve toward the measurer, taking care that the lens does not touch the sides of the well after being removed from the saline. As illustrated schematically in FIG. 1, the lens (101) is shaken once to remove excess saline and a timer is started. Ideally, the water film (120) in the base curve surface of the lens will recede from the point of contact with the tweezers's tips (111) in a uniform, circular pattern (125). When approximately 30% of the hydrated area (125) has receded, the timer is stopped and this time is recorded as the water breakup time (WBUT). Lenses that do not display the ideal receding pattern can be placed back in the tray and re-measured, after rehydrating for at least 30 seconds.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. Transmittance is calculated using the following equations:

$$UVA \% \ T = \frac{\text{Average \% T between } 380-316 \text{ nm}}{\text{Luminescence \% } T} \times 100$$

$$UVB \% \ T = \frac{\text{Average \% T between } 280-315 \text{ nm}}{\text{Luminescence \% } T} \times 100$$

$$\text{Violet} \% \ T = \frac{\text{Average \% T between } 440-380 \text{ nm}}{\text{Luminescence \% } T} \times 100$$

in which Luminescence % T is the average % transmission between 380 and 780.

Chemicals

The following abbreviations are used in the following examples: NVP represents N-vinylpyrrolidone; DMA represents N,N-dimethylacrylamide; VMA represents N-vinyl-N-methyl acetamide; MMA represents methyl methacrylate; TEGDMA represent triethyleneglycol dimethacrylate; TEGDVE represents triethyleneglycol divinyl ether; EGMA represents ethylene glycol methyl ether methacrylate; VAZO 64 represents 2,2'-dimethyl-2,2'azodipropiononitrile; Nobloc is 2-[3-(2H-Benzotriazol-2-yl)-4-hydroxyphenyl]ethyl methacrylate from Aldrich; UV28 represents 2-{2'-Hydroxy-3'-tert-butyl-5'-[3'-methacryloyloxypropoxy]phenyl}-5-chloro-2H-benzotriazole; RB246 is Reactive Blue 246; RB247 is Reactive Blue 247; TAA represents tert-amyl alcohol; PrOH represents 1-propanol; IPA represents isopropanol; DC 1173 represents Darocur 1173® photoinitiator; MeCN represents acetonitrile; SiGMA represents 3-(3-methacryloxy-2-hydroxypropyloxypropyl-bis(trimethylsiloxy)methylsilane; mSi1 represents monobutyl-terminated monomethacryloxypropyl-terminated polydimethylsiloxane (Mw~600 to 800 g/mol from Gelest); mSi2 represents monobutyl-terminated monomethacryloxypropyl-terminated polydimethylsiloxane (Mw~1100 g/mol from Gelest); D3 represents monobutyl-terminated monomethacryloxypropyl-terminated polydimethylsiloxane (Mw~539 g/mol from Shin-Etsu); D6 represents monobutyl-terminated monomethacryloxypropyl-terminated polydimethylsiloxane (Mw~761 g/mol from Shin-Etsu); D9 represents monobutyl-terminated monomethacryloxypropyl-terminated polydimethylsiloxane (Mw~984 g/mol from Shin-Etsu); D7 represents monobutyl-terminated monomethacryloxypropyl-terminated polydimethylsiloxane (Mw~750 g/mol from Shin-Etsu); D8 represents monobutyl-terminated monomethacryloxypropyl-terminated polydimethylsiloxane (Mw~850 g/mol from Shin-Etsu); LM-CEPDMS represents a di-methacrylate-terminated chain-extended polydimethylsiloxane (Mn~6000 g/mol), which has three polydimethylsiloxane (PDMS) segments linked via diurethane linkages between two PDMS segments and two urethane linkages each located between one terminal methacrylate group and one PDMS segment, is prepared according to a method similar to what described in Example 2 of U.S. Pat. No. 8,529,057; CEPDMS represents a di-methacrylate-terminated chain-extended polydimethylsiloxane (Mn~9000 g/mol), which has three polydimethylsiloxane (PDMS) segments linked via diurethane linkages between two PDMS segments and two urethane linkages each located between one terminal methacrylate group and one PDMS segment, is prepared according to method similar to what described in Example 2 of U.S. Pat. No. 8,529,057; Betacon represents a dimethacrylate-terminated chain-extended polydimethylsiloxane (Mn~5000 g/mol), which has two polydimethylsiloxane (PDMS) segments separated by one perfluoropolyether (PFPE) via diurethane linkages between PDMS and PFPE segments and two urethane linkages each located between one terminal methacrylate group and one PDMS segment, is prepared according to method similar to what described in Example B-1 of U.S. Pat. No. 5,760,100; "GA" macromer represents a di-methacryloyloxypropyl-terminated polysiloxane (Mn~6.8K g/mol, OH content~1.2 meq/g) of formula (A) shown above; "G0" macromer represents a di-methacryloyloxypropyl-terminated polysiloxane (Mn~8.0K g/mol, OH content~1.8 meq/g) of formula (A) shown above; "G1" macromer represents a di-methacryloyloxypropyl-terminated polysiloxane (Mn~10.7K g/mol, OH content~1.8 meq/g) of formula (A) shown above; "G3" macromer represents a di-methacryloyloxypropyl-terminated polysiloxane (Mn~16.3K g/mol, OH content~1.8 meq/g) of formula (A) shown above; "G4" macromer represents a di-methacryloyloxypropyl-terminated polysiloxane (Mn~13.5K g/mol, OH content~1.8 meq/g) of formula (A) shown above; "G5" macromer represents a di-methacryloyloxypropyl-terminated polysiloxane (Mn~14.8K g/mol, OH content~2.2 meq/g) of formula (A) shown above; "G6" macromer represents a di-methacryloyloxypropyl-terminated polysiloxane (Mn~17.9K g/mol, OH content~2.2 meq/g) of formula (A) shown above. All the di-methacryloyloxypropyl-terminated polysiloxane of formula (A) are prepared according to the procedures described in U.S. Pat. Appl. Pub. No. 2017-0166673 A1.

Example 2

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold. The dry state lens is loaded in a designed extraction tray. Alternatively, lenses can be removed from the base curve mold halves by floating off (i.e., soaking in an organic solvent, e.g., IPA, without ultrasonic). The lenses removed from the molds are subjected to an extraction process using water or an organic solvent or a mixture of solvents for at least 30 minutes. For example, extracted in 50% IPA for 30 min, or in 100% IPA for 15 min then back to 50% IPA for 30 min, DI water for 30 min and finally in PBS saline overnight. Inspected lens is packaged in lens packages containing a phosphate buffered saline (pH~7.2) and autoclaved at 121° C. for about 30-45 minutes.

Example 3

A lens formulation is purged with nitrogen at room temperature for 30 to 35 minutes. The $N_2$-purged lens formulation is introduced into polypropylene molds and cured by UV/visible light (Hamamatsu lamp) for a curing time period. The post cast molding procedures described in Example 2 are used in this process for producing SiHy contact lenses.

Examples 4-24

In Examples 4 to 24, polymerizable compositions are prepared and listed in Tables 1-4. All the concentrations of the components listed in the tables are weight part units. The prepared polymerizable compositions comprises 0.01 weight part of a reactive dye (RB246 or RB247) and 0.5 weight part of free radical initiator (either VAZO 64 for thermally curable compositions or DC1173 for UV-curable compositions).

TABLE 1

|  | Ex. 4 | Ex. 5 | Ex. 6 | Ex. 7 | Ex. 8 | Ex. 9 |
| --- | --- | --- | --- | --- | --- | --- |
| 1$^{st}$ mPDMS | 40 (mSi1) | 33 (mSi1) | 33 (mSi2) | 30 (mSi1) | 26 (mSi1) | 40 (mSi2) |
| Si Macromer | 5 (CE-PDMS) | 10 (CE-PDMS) | 10 (CE-PDMS) | 14 (CE-PDMS) | 17 (CE-PDMS) | 5 (CE-PDMS) |
| NVP | 43 | 40 | 40 | 44 | 43 | 43 |
| MMA | 10 | 15 | 15 | 10 | 15 | 10 |
| TEGDMA | 0.2 | 0.2 | 0.2 | 0.2 | 0.2 | 0.2 |
| Solvent | 0 | 0 | 0 | 6 (TAA) | 0 | 0 |
| Curing Profile | 55/70/100° C. 4 h/4 h/1 h | 55/70/100° C. 4 h/4 h/1 h | 55/70/100° C. 4 h/4 h/1 h | 55/70/100° C. 4 h/4 h/1 h | 55/70/100° C. 4 h, 4 h, 1 h | 55/70/100° C. 4 h/4 h/1 h |
| Extraction Medium | IPA | IPA | IPA | IPA | IPA | IPA |

TABLE 2

|  | Ex. 10 | Ex. 11 | Ex. 12 | Ex. 13* | Ex. 14 | Ex. 15 |
|---|---|---|---|---|---|---|
| 1st mPDMS | 26 (mSi2) | 35 (mSi1) | 37 (mSi2) | 18 (mSi2) | 34 (D6) | 22 (D3) |
| 2nd mPDMS | 0 | 0 | 0 | 16 (mSi1) | 0 | 0 |
| Si Macromer | 17 (CE-PDMS) | 5 (CE-PDMS) | 3 (betacon) | 5 (betacon) | 6 (GA) | 25 (G1) |
| NVP | 40 | 48 | 50 | 50 | 40 | 43 |
| MMA | 15 | 10 | 10 | 5 | 10 | 10 |
| TEGDMA | 0.2 | 0.2 | 0.5 | 1 | 0.2 | 0.2 |
| HEMA | 0 | 0 | 0 | 0 | 0.2 | 0 |
| TEGDVE | 0 | 0 | 0.1 | 0.1 | 0 | 0 |
| Norbloc | 0.9 | 0.9 | 0.9 | 0.9 | 0.9 | 2 |
| Solvent | 10 (1-hexanol) | 10 (PrOH) | 0 | 0 | 3 (TAA) | 0 |
| Curing Profile | 55/70/100° C. 4 hr/4 hr/1 hr | 55/70/100° C. 4 hr/4 hr/1 hr | 55/80/100° C. (40 min/)₂40 min | 55/80/100° C. (40 min/)₂40 min | 55/80/100° C.; (30 min/)₂30 min | 55/80/100° C. 1 hr/1 hr/1 hr |
| Extraction medium | IPA | IPA | IPA; & aqueous | IPA, & aqueous | H2O; & IPA | IPA |

*also contains 5 weight part units of methoxy ethyleneglycol methacrylate.

TABLE 3

|  | Ex. 16 | Ex. 17 | Ex. 18 | Ex. 19 | Ex. 20 | Ex. 21 |
|---|---|---|---|---|---|---|
| 1st mPDMS | 25 (D3) | 35 (D3) | 33 (mSi1) | 25 (mSi1) | 30 (D9) | 35 (D6) |
| Si Macromer | 25 (G1) | 10 (G1) | 4 (LMW-CEPDMS) | 25 (GA) | 16 (G3) | 12 (G1) |
| NVP | 40 | 48 | 53 | 40 | 45 | 46 |
| MMA | 10 | 7 | 10 | 10 | 7 | 7 |
| TEGDMA | 0.2 | 0.2 | 0.2 | 0.2 | 0.2 | 0.2 |
| Norbloc | 2 | 2 | 2 | 2 | 2 | 2 |
| Solvent | 0 | 0 | 0 | 0 | 7 (TAA) | 3 (TAA) |
| Curing Profile | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr |
| Extraction medium | IPA | IPA | H₂O | IPA | IPA | IPA |

TABLE 4

|  | Ex. 22 | Ex. 23 | Ex. 24 |
|---|---|---|---|
| 1st mPDMS | 18 (mSi2) | 18 (mSi2) | 36.5 (D3) |
| 2nd mPDMS | 16 (mSi1) | 16 (mSi1) | 0 |
| Si Macromer | 5 (betacon) | 5 (LMW-CEPDMS) | 7.7 (CE-PDMS) |
| NVP | 50 | 50 | 43.8 |
| MMA | 5 | 5 | 10 |
| TEGDMA | 1 | 1 | 0 |
| DMA | 0.1 | 0.1 | 0 |
| Initiator | 0.5 (DC1173) | 0.5 (DC1173) | 0.5 (VAZO 64) |
| Curing Profile | 5 mW/cm² 30 min | 5 mW/cm² 30 min | 55/70/100° C. 4 hr/4 hr/1 hr |
| Extraction medium | IPA; & aqueous | IPA; & aqueous | IPA |

SiHy contact lenses are prepared from those polymerizable compositions according to curing processes described in Example 2 or 3. The lens properties of resultant SiHy contact lenses are determined according to procedure described in Example 1 and reported in Table 5.

TABLE 5

|  | [NVA] mmol [Si comp] g | [H-D] meq [NVA] g | Dk (Barrers) | EWC (%) | Modulus (MPa) | WBUT (s) | $WCA_{CB}$ (°) |
|---|---|---|---|---|---|---|---|
| Ex. 4 | 8.6 | 0.078 | NA | NA | NA | 2 | NA |
| Ex. 5 | 8.4 | 0.17 | NA | NA | NA | 1 | NA |
| Ex. 6 | 8.4 | 0.17 | NA | NA | NA | 1 | NA |
| Ex. 7 | 9.0 | 0.21 | 106 | NA | 0.79 | 10 | NA |
| Ex. 8 | 9.0 | 0.26 | NA | NA | NA | 5 | NA |
| Ex. 9 | 8.6 | 0.078 | NA | NA | NA | 5 | NA |
| Ex. 10 | 8.4 | 0.28 | NA | NA | NA | 5 | NA |
| Ex. 11 | 10.8 | 0.07 | NA | NA | NA | <1 | NA |
| Ex. 12 | 11.2 | 0.072 | NA | 50.8 | 1.11 | 3~5 | NA |
| Ex. 13 | 11.5 | 0.10 | NA | NA | NA | 0~2 | NA |
| Ex. 14 | 9.0 | 0.18 | 85 | 49 | 0.69 | 15 | NA |
| Ex. 15 | 8.2 | 1.05 | 106 | 44 | NA | <5 | NA |
| Ex. 16 | 7.2 | 1.13 | 120 | 41 | NA | <1 | NA |
| Ex. 17 | 9.6 | 0.38 | 113 | 48 | 0.77 | 10 | 54 |
| Ex. 18 | 12.9 | 0.075 | 88 |  | 0.6 | 5 | 55 |
| Ex. 19 | 7.2 | 0.75 | 117 | 40 | 1.2 | 8 | NA |

TABLE 5-continued

|  | [NVA] mmol [Si comp] g | [H-D] meq [NVA] g | Dk (Barrers) | EWC (%) | Modulus (MPa) | WBUT (s) | WCA$_{CB}$ (°) |
|---|---|---|---|---|---|---|---|
| Ex. 20 | 8.8 | 0.64 | 126 | 54 | 0.66 | 30 | 44 |
| Ex. 21 | 8.8 | 0.47 | 112 | 52 | 0.65 | 14 | 45 |
| Ex. 22 | 11.5 | 0.12 | NA | NA | 0.44 | 15 | 25~40 |
| Ex. 23 | 11.5 | 0.10 | NA | NA | NA | 15 | 40 |
| Ex. 24 | 8.9 | 0.12 | 85 | 50 | 0.56 | 11 | 64 |

NVA: N-vinyl amide monomer(s);
H-D: H-donor moieties;
Si-comp: all silicone-containing polymerizable component.

As shown in Table 5, there are two limitations on the amounts of the siloxane-containing vinylic monomer, the polysiloxane vinylic crosslinker and the N-vinyl amide monomer in a polymerizable composition for forming inherently wettable SiHy contact lenses.

The first limitation appears to be that there is a threshold amount of the N-vinyl amide monomer relative to the total amount of all silicone-containing polymerizable components. That threshold value of the amount of the N-vinyl amide monomer is likely around 8.8 mmoles per gram of all the silicone-containing polymerizable components. In order to form inherently wettable SiHy contact lenses, a polymerizable composition should comprise about 8.8 mmoles or more per gram of all silicone-containing polymerizable components present in the polymerizable composition.

The second limitation appears to be that there is also a threshold value for the total amount of the H-donor moieties ("H-D") contributed by the polysiloxane vinylic crosslinker and the siloxane-containing vinylic monomer relative to the amount of the N-vinyl amide monomer. That threshold value appears to be around 0.11 meqs of H-donor moieties per gram of the N-vinyl amide monomer. In order to form inherently wettable SiHy contact lenses, a polymerizable composition should comprise about 0.11 meqs or more of H-donor moieties (contributed from all the silicone-containing polymerizable components) per gram of the N-vinyl amide monomer.

Examples 25-76

In Examples 25 to 76, polymerizable compositions are prepared and listed in Tables 6a-6h. All the concentrations of the components listed in the tables are weight part units. The prepared polymerizable compositions comprises 0.01 weight part of a reactive dye (RB246 or RB247) and 0.5 weight part of free radical initiator (either VAZO 64 for thermally curable compositions or DC1173 for UV-curable compositions).

TABLE 6a

|  | Ex. 25 | Ex. 26 | Ex. 27 | Ex. 28 | Ex. 29 | Ex. 30 |
|---|---|---|---|---|---|---|
| mPDMS | 25 (mSi1) | 23 (D3) | 35 (D3) | 35 (D3) | 35 (D3) | 35 (D3) |
| Si macromer | 20 (G3) | 18 (G3) | 10 (G0) | 10 (G1) | 10 (G1) | 10 (G1) |
| NVP | 46 | 50 | 48 | 48 | 48 | 48 |
| MMA | 7 | 7 | 7 | 7 | 7 | 7 |
| TEGDMA | 0.2 | 0.2 | 0.2 | 0.2 | 0.2 | 0.2 |
| TEGDVE | 0 | 0 | 0 | 0 | 0.05 | 0.1 |
| Norbloc | 2 | 2 | 2 | 2 | 2 | 2 |
| TAA | 5 | NA | 10 | 0 | 0 | 0 |
| Curing Profile | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr |
| Extraction medium | IPA | IPA | IPA | IPA | IPA | IPA |

TABLE 6b

|  | Ex. 31 | Ex. 32 | Ex. 33 | Ex. 34 | Ex. 35 | Ex. 36 |
|---|---|---|---|---|---|---|
| mPDMS | 35 (D6) | 35 (D6) | 35 (D6) | 35 (mSi1) | 35 (mSi1) | 35 (mSi1) |
| Si macromer | 12 (G1) | 12 (G1) | 12 (G1) | 10 (G1) | 10 (G1) | 10 (G1) |
| NVP | 46 | 46 | 46 | 48 | 48 | 48 |
| MMA | 7 | 7 | 7 | 7 | 7 | 7 |
| TEGDMA | 0.2 | 0.2 | 0.2 | 0.1 | 0.1 | 0.1 |
| Norbloc | 2 | 2 | 2 | 1.8 | 1.8 | 2 |
| TAA | 3 | 3 | 3 | 0 | 0 | 10 |
| Curing Profile | 55/80/100° C. 1 hr/2 hr/1 hr | 55/70/100° C. 4 hr/4 hr/1 hr | 55/70/100° C. 4 hr/4 hr/2 hr | 55/80/100° C. 2 hr/2 hr/2 hr | 55/90/100° C. 1 hr/1 hr/1 hr | 55/70/100° C. 4 hr/4 hr/2 hr |
| Extraction medium | IPA | IPA | IPA | IPA | IPA | IPA |

TABLE 6c

|  | Ex. 37 | Ex. 38 | Ex. 39 | Ex. 40 | Ex. 41 | Ex. 42 | Ex. 43 |
|---|---|---|---|---|---|---|---|
| mPDMS | 30 (mSi1) | 30 (mSi1) | 30 (D9) | 30 (D9) | 23 (D9) | 30 (D9) | 30 (D9) |
| Si macromer | 15 (G1) | 15 (G1) | 16 (G3) | 16 (G3) | 20 (G3) | 16 (G3) | 16 (G3) |
| NVP | 48 | 48 | 45 | 45 | 48 | 45 | 45 |
| MMA | 7 | 7 | 7 | 7 | 7 | 7 | 7 |
| TEGDMA | 0.2 | 0.2 | 0.2 | 0.2 | 0.2 | 0.2 | 0.2 |
| HEMA | 0 | 0 | 0 | 0 | 0 | 1 | 0 |
| DMA | 0 | 0 | 0 | 2 | 2 | 0 | 0 |
| Norbloc | 2 | 2 | 2 | 2 | 2 | 2 | 2 |
| UV28 | 0 | 0 | 0 | 0 | 0 | 0 | 0.4 |
| TAA | 0 | 0 | 9 | 9 | 5 | 9 | 9 |
| Curing Profile | 55/80/100° C. 1 hr/2 hr/1 hr | 55/70/100° C. 4 hr/4 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr |
| Extraction medium | IPA | IPA | IPA | IPA | IPA | IPA | IPA |

TABLE 6d

|  | Ex. 44 | Ex. 45 | Ex. 46 | Ex. 47 | Ex. 48 | Ex. 49 | Ex. 50 |
|---|---|---|---|---|---|---|---|
| mPDMS | 30 (D9) | 27 (D9) | 27 (D9) | 27 (D9) | 27 (D6) | 27 (D6) | 27 (D6) |
| Si macromer | 16 (G4) | 16 (G4) | 16 (G4) | 16 (G4) | 16 (G4) | 16 (G4) | 16 (G4) |
| NVP | 45 | 48 | 48 | 48 | 48 | 48 | 48 |
| MMA | 7 | 7 | 7 | 7 | 7 | 7 | 7 |
| TEGDMA | 0.2 | 0.2 | 0.2 | 0.2 | 0.2 | 0.2 | 0.2 |
| HEMA | 0 | 0 | 0 | 1 | 0 | 0 | 1 |
| DMA | 0 | 0 | 2 | 0 | 0 | 2 | 0 |
| Norbloc | 2 | 2 | 2 | 2 | 2 | 2 | 2 |
| TAA | 9 | 10 | 10 | 10 | 3 | 3 | 3 |
| Curing Profile | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr | 55/80/100° C. 1 hr/1 hr/1 hr |
| Extraction medium | IPA | IPA | IPA | IPA | IPA | IPA | IPA |

TABLE 6e

|  | Ex. 51 | Ex. 52 | Ex. 53 | Ex. 54 | Ex. 55 | Ex. 56 | Ex. 57 |
|---|---|---|---|---|---|---|---|
| mPDMS | 27 (D9) | 23 (D6) | 23 (D6) | 27 (mSi1) | 27 (D9) | 33 (D9) | 33 (D9) |
| Si macromer | 16 (G4) | 20 (G4) | 20 (G4) | 16 (G4) | 16 (G4) | 10 (G4) | 10 (G4) |
| NVP | 48 | 48 | 48 | 48 | 48 | 46 | 46 |
| MMA | 7 | 7 | 7 | 7 | 7 | 10 | 10 |
| TEGDMA | 0.2 | 0.2 | 0.2 | 0.2 | 0.2 | 0.2 | 0.2 |
| DMA | 0 | 0 | 2 | 0 | 0 | 0 | 0 |
| Norbloc | 1.8 | 2 | 2 | 2 | 1.8 | 1.5 | 1.5 |
| UV28 | 0 | 0 | 0 | 0 | 0 | 0.26 | 0.26 |
| TAA | 3 | 3 | 3 | 10 | 10 | 10 | 10 |
| Curing Profile | 55/80/100° C. 30 min/2 hr/30 min | 55/80/100° C. 1 hr/1 hr/1 hr | 55/80/100° C. 1 hr/1 hr/1 hr | 60/80/100° C. 2.5 hr/2.5 hr/1 hr | 55/80/100° C. 30 min/2 hr/30 min | 55/80/100° C. 30 min/2 hr/30 min | 55/80/100° C. 40 min/40 min/40 min |
| Extraction medium | IPA | IPA | IPA | IPA | IPA | IPA | IPA |

TABLE 6f

|  | Ex. 58 | Ex. 59 | Ex. 60 | Ex. 61 | Ex. 62 | Ex. 63 | Ex. 64 |
|---|---|---|---|---|---|---|---|
| mPDMS | 30 (D9) | 35 (D6) | 33 (D6) | 27 (D9) | 33 (D9) | 33 (D9) | 33 (D9) |
| Si macromer | 10 (G4) | 12 (G1) | 11 (G4) | 16 (G4) | 10 (G4) | 10 (G4) | 10 (G4) |
| NVP | 46 | 46 | 46 | 48 | 46 | 46 | 46 |
| MMA | 13 | 10.5 | 11 | 7 | 10 | 10 | 10 |
| TEGDMA | 0.2 | 0.1 | 0.65 | 0.2 | 0.2 | 0.65 | 0.2 |
| Norbloc | 1.5 | 1.5 | 1.5 | 1.8 | 1.8 | 1.5 | 1.5 |
| UV28 | 0.26 | 0.26 | 0.4 | 0 | 0 | 0.4 | 0.35 |
| TAA | 10 | 8 | 10 | 10 | 10 | 10 | 10 |
| Curing | 55/80/100° C. | 55/80/100° C. | 55/80/100° C. | 55/80/100° C. | 55/80/100° C. | 55/80/100° C. | 55/80/100° C. |

TABLE 6f-continued

|  | Ex. 58 | Ex. 59 | Ex. 60 | Ex. 61 | Ex. 62 | Ex. 63 | Ex. 64 |
|---|---|---|---|---|---|---|---|
| Profile | 40 min/ 40 min/ 40 min | 40 min/ 40 min/ 40 min | 30 min/ 120 min/ 30 min | 30 min/ 120 min/ 30 min | 30 min/ 120 min/ 30 min | 30 min/ 120 min/ 30 min | 30 min/ 120 min/ 30 min |
| Extraction medium | IPA | IPA | IPA | IPA | IPA | IPA | IPA |

TABLE 6g

|  | Ex. 65 | Ex. 66 | Ex. 67 | Ex. 68 | Ex. 69 | Ex. 70 |
|---|---|---|---|---|---|---|
| mPDMS | 30 (D9) | 30 (D9) | 35 (D6) | 35 (D6) | 37 (D6) | 34 (1667B) |
| Si macromer | 10 (G4) | 10 (G4) | 12 (G1) | 12 (G1) | 10 (G1) | 6 (GA) |
| NVP | 46 | 46 | 46 | 0 | 0 | 40 |
| VMA | 0 | 0 | 0 | 45 | 45 | 0 |
| MMA | 13 | 13 | 10.5 | 8 | 8 | 9 |
| TEGDMA | 0.2 | 0.2 | 0.1 | 0.1 | 0.1 | 0.4 |
| HEMA | 0 | 0 | 0 | 0 | 0 | 0.4 |
| Norbloc | 1.8 | 1.5 | 1.8 | 0 | 0 | 1.8 |
| UV28 | 0 | 0.26 | 0 | 0 | 0 | 0 |
| TAA | 10 | 10 | 8 | 0 | 0 | 3 |
| Curing Profile | 55/80/100° C. 0.67 hr/0.67 hr/ 0.67 hr | 55/80/100° C. 0.67 hr/0.67 hr/ 0.67 hr | 55/70/100° C. 4 hr/4 hr/1 hr | 55/70/100° C. 4 hr/4 hr/1 hr | 55/70/100° C. 4 hr/4 hr/1 hr | 55/80/100° C. 30 min/30 min/ 30 min |
| Extraction medium | IPA | IPA | IPA | IPA | IPA | H2O; IPA |

TABLE 6h

|  | Ex. 71 | Ex. 72 | Ex. 73 | Ex. 74 | Ex. 75 | Ex. 76 |
|---|---|---|---|---|---|---|
| mPDMS | 33 (D9) | 33 (D9) | 33 (D9) | 33 (D9) | 33 (D9) | 33 (D9) |
| Si macromer | 10 (G4) | 10 (G4) | 10 (G4) | 10 (G4) | 10 (G4) | 10 (G4) |
| NVP | 0 | 0 | 24 | 32 | 0 | 0 |
| VMA | 42 | 42 | 20 | 12 | 42 | 42 |
| MMA | 14 | 14 | 12 | 12 | 14 | 14 |
| TEGDMA | 0.65 | 0.65 | 0.65 | 0.65 | 0.65 | 0.65 |
| HEMA | 0 | 1 | 0 | 0 | 3 | 5 |
| Norbloc | 1.5 | 1.5 | 1.5 | 1.5 | 1.5 | 1.5 |
| UV28 | 0.4 | 0.4 | 0.4 | 0.4 | 0.4 | 0.4 |
| TAA | 10 | 10 | 10 | 10 | 10 | 10 |
| Curing Profile | 55/80/100° C. 40 min/40 min/ 40 min | 55/80/100° C. 40 min/40 min/ 40 min | 55/80/100° C. 40 min/40 min/ 40 min | 55/80/100° C. 40 min/40 min/ 40 min | 55/80/100° C. 40 min/40 min/ 40 min | 55/80/100° C. 40 min/40 min/ 40 min |
| Extraction medium | IPA | IPA | IPA | IPA | IPA | IPA |

SiHy contact lenses are prepared from those polymerizable compositions according to curing processes described in Example 2 or 3. The lens properties of resultant SiHy contact lenses are determined according to procedure described in Example 1 and reported in Table 7.

TABLE 7

|  | [NVA] mmol [Si comp] g | [H-D] meq [NVA] g | Dk (barrers) | EWC (%) | Modulus (MPa) | WBUT (s) | $WCA_{CB}$ (°) |
|---|---|---|---|---|---|---|---|
| Ex. 25 | 9.2 | 0.78 | 104 | 53 | 0.67 | 25 | 44 |
| Ex. 26 | 11.0 | 0.65 | 83 | 56 | 0.54 | 14 | 48 |
| Ex. 27 | 9.6 | 0.38 | 108 | 50 | 0.72 | NA | 49 |
| Ex. 28 | 9.6 | 0.38 | 113 | 48 | NA | 14 | 55 |
| Ex. 29 | 9.6 | 0.38 | 111 | 48 | NA | 17 | 52 |
| Ex. 30 | 9.6 | 0.38 | 110 | 49 | NA | 17 | 54 |
| Ex. 31 | 8.8 | 0.47 | 112 | 50 | 0.65 | 11 | 49 |
| Ex. 32 | 8.8 | 0.47 | 109 | 50 | 0.73 | 20 | 47 |
| Ex. 33 | 8.8 | 0.47 | 102 | NA | 0.74 | 23 | 45 |
| Ex. 34 | 9.6 | 0.38 | 92 | NA | 0.73 | 53 | 51 |

TABLE 7-continued

|  | [NVA] mmol [Si comp] g | [H-D] meq [NVA] g | Dk (barrers) | EWC (%) | Modulus (MPa) | WBUT (s) | $WCA_{CB}$ (°) |
|---|---|---|---|---|---|---|---|
| Ex. 35 | 9.6 | 0.38 | 91 | NA | 0.71 | 78 | 61 |
| Ex. 36 | 9.6 | 0.38 | 102 | 52 | 0.64 |  | 42 |
| Ex. 37 | 9.6 | 0.56 | 115 | 50 | 0.73 | 11 | 49 |
| Ex. 38 | 9.6 | 0.56 | 114 | 50 | 0.73 | 15 | 46 |
| Ex. 39 | 8.8 | 0.64 | 127 |  | 0.59 | 43 | 44 |
| Ex. 40 | 8.8 | 0.64 | 165 |  | 0.52 | 48 | 44 |
| Ex. 41 | 10.0 | 0.75 | 102 |  | 0.58 | 45 | 54 |
| Ex. 42 | 8.8 | 0.64 | 162 |  | 0.62 | 49 | 47 |
| Ex. 43 | 8.8 | 0.64 | 127 | 53 | NA | NA | 44 |
| Ex. 44 | 8.8 | 0.64 | 130 | NA | 0.82 | 65 | 40 |
| Ex. 45 | 10.0 | 0.60 | 145 |  | 0.79 | 51 | 41 |
| Ex. 46 | 10.0 | 0.60 | 135 |  | 0.7 | 55 | 43 |
| Ex. 47 | 10.0 | 0.60 | 132 |  | 0.73 | 49 | 41 |
| Ex. 48 | 10.0 | 0.60 | 111 |  | 0.85 | 44 | 49 |
| Ex. 49 | 10.0 | 0.60 | 108 |  | 0.74 | 51 | 51 |
| Ex. 50 | 10.0 | 0.60 | 99 |  | 0.85 | 54 | 50 |
| Ex. 51 | 10.0 | 0.60 | 118 | 54 | 0.59 | 54 | 46 |
| Ex. 52 | 10.0 | 0.75 | 116 |  | 0.84 | 36 | NA |
| Ex. 53 | 10.0 | 0.75 | 108 | NA | 0.74 | 51 | 51 |
| Ex. 54 | 10.0 | 0.60 | 115 |  | 0.73 | 62 | 46 |
| Ex. 55 | 10.0 | 0.60 | 115 | 54 | 0.67 | 22 | 42 |
| Ex. 56 | 9.6 | 0.39 | 114 | 57 | 0.45 | 23 | 52 |
| Ex. 57 | 9.6 | 0.39 | 114 | 56 | 0.47 | 23 | 49 |
| Ex. 58 | 10.3 | 0.39 | 102 | 58 | 0.47 | 21 | 53 |
| Ex. 59 | 8.8 | 0.47 | 107 | 52 | 0.54 | 21 | 55 |
| Ex. 60 | 10.0 | 0.60 | 109 | NA | 0.62 | NA | 50 |
| Ex. 61 | 9.6 | 0.39 | 111 | 54 | 0.67 | 22 | 42 |
| Ex. 62 | 10.0 | 0.53 | 118 | 55 | 0.5 | 23 | 47 |
| Ex. 60 | 9.4 | 0.43 | 109 | NA | 0.65 | NA | 50 |
| Ex. 64 | 9.6 | 0.39 |  | 53 | 0.51 | 30 | 52 |
| Ex. 65 | 10.3 | 0.39 | 106 | 55 | 0.48 | 21 | 54 |
| Ex. 66 | 10.3 | 0.39 |  | 57 | 0.5 | 30 | 53 |
| Ex. 67 | 8.8 | 0.47 | 119 | 51 | 0.65 | 21 | 51 |
| Ex. 68 | 9.7 | 0.48 |  | 61 | 0.7 | 60 |  |
| Ex. 69 | 9.7 | 0.40 |  | 60 |  | 60 |  |
| Ex. 70 | 9.0 | 0.27 | 85.5 | 50 | 0.6 | 25 | NA |
| Ex. 71 | 9.9 | 0.43 | 121 | 53 | 0.67 | 53 | 58 |
| Ex. 72 | 9.9 | 0.43 | 118 | 53 | 0.67 | 56 | 54 |
| Ex. 73 | 9.7 | 0.41 | NA | 54 | 0.63 | 61 | 50 |
| Ex. 74 | 9.5 | 0.41 | NA | 53 | 0.64 | 62 | 49 |
| Ex. 75 | 9.9 | 0.43 | NA | 53 | 0.69 | 65 | 50 |
| Ex. 76 | 9.9 | 0.43 | NA | 52 | 0.71 | 65 | 53 |

Table 7 shows that when a polymerizable composition comprises at least 8.8 mmoles of N-vinyl amide monomer(s) (NVP and/or VMA) per gram of the sum of the siloxane-containing vinylic monomer and the polysiloxane vinylic crosslinker and greater than 0.11 meqs of the H-donor moieties (i.e., hydroxyl groups of the polysiloxane vinylic crosslinker) per gram of N-vinyl amide monomer(s) (NVP and/or VMA), the resultant SiHy lenses prepared from such a composition are inherently wettable.

Example 74

The surface compositions of SiHy contact lenses are determined by characterizing vacuum dried contact lenses with X-ray photoelectron spectroscopy (XPS). XPS is a method for measuring the surface composition of lenses with a sampling depth of about 10 nm.

XPS analysis of SiHy contact lenses of the invention (prepared according to the procedures described in Examples 21 and 56) and commercial SiHy contact lenses without plasma treatment or any coating (ACUVUE® Advance®, MyDay, CLARITI™, AVAIRA, ACUVUE® TruEye™, Oasys®, Ultra™, Biofinity®) are carried out. All lenses are vacuum-dried. Polyethylene sheets (Goodfellow, LDPE, d=0.015 mm) and DAILIES® AquaComfortPlus (DACP) are used as control because they do not contain silicon. The surface compositions of SiHy contact lenses are reported in Table 8 below.

TABLE 8

|  | $H_2O$ % | Dk (barrers) | Atomic percentage by XPS | | | | | |
|---|---|---|---|---|---|---|---|---|
|  |  |  | C | N | O | F | Si | N/Si |
| Polyethylene control |  |  | 82.9 | 2.2 | 12.4 | 0.9 | 1.7 |  |
| Dailies ® AquaComfortPlus ® |  |  | 55.8 | 2.2 | 37.7 | 1.5 | 2.7 |  |
| Advance ® | 47 | 65 | 61.1 | 4.9 | 24.9 | 0.7 | 8.4 | 0.58 |
| Clariti ™ | 56 | 60 | 57.4 | 4.8 | 26.6 | 0.9 | 10.3 | 0.47 |
| MyDay ™ | 54 | 80 | 61.3 | 3.4 | 26.9 | nm | 8.4 | 0.41 |
| AVAIRA ® | 46 | 100 | 52.4 | 2.5 | 27.8 | 4.2 | 13.1 | 0.19 |
| TruEye ® | 46 | 100 | 58.1 | 4.9 | 29 | 1 | 6.9 | 0.71 |
| Oasys ® | 38 | 103 | 54.5 | 4.4 | 30.9 | 0.8 | 9.4 | 0.47 |

TABLE 8-continued

|  | | Dk | Atomic percentage by XPS | | | | | |
|---|---|---|---|---|---|---|---|---|
|  | H$_2$O % | (barrers) | C | N | O | F | Si | N/Si |
| Example 21 | 52 | 112 | 57.7 | 4.6 | 25.4 | 0.7 | 11.7 | 0.39 |
| Example 53 | 57 | 114 | 59.9 | 4.6 | 24.8 | 0.5 | 10.2 | 0.45 |
| Ultra ™ | 46 | 114 | 59.2 | 3.3 | 24.2 | 0.6 | 12.7 | 0.26 |
| Biofinity ® | 48 | 128 | 43.1 | 2.1 | 30.7 | 4.8 | 19.3 | 0.11 |

The low value of Si % for the two control samples and the observed fluorine content in the non-fluorine-containing lenses indicate some contaminants which could be introduced during the preparation process including vacuum drying process and XPS analysis. The values of atomic Si percentage for control samples may represent the base line of XPS analysis.

All the publications, patents, and patent application publications, which have been cited herein above in this application, are hereby incorporated by reference in their entireties.

What is claimed is:

1. A silicone hydrogel contact lens, comprising a silicone hydrogel bulk material which comprises:
   (1) first repeating units of at least one siloxane-containing vinylic monomer including 0 to 10 first H-donor moieties,
   (2) second repeating units of at least one first polysiloxane vinylic crosslinker which has second H-donor moieties and is a compound of formula (1)

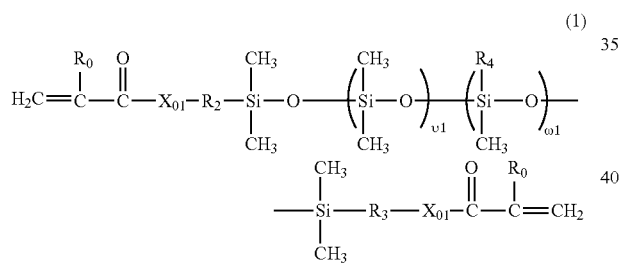

in which
   υ1 is an integer of from 30 to 500 and ω1 is an integer of from 1 to 75,
   provided that ω1/υ1 is from 0.035 to 0.15,
   $X_{01}$ is O or $NR_n$ in which $R_n$ is hydrogen or $C_1$-$C_{10}$ alkyl,
   $R_o$ is hydrogen or methyl,
   $R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical,
   $R_4$ is a monovalent radical of formula (2),

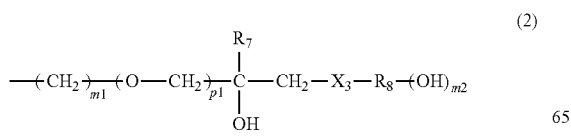

p1 is zero or 1,
   m1 is an integer of 2 to 4,
   m2 is an integer of 1 to 5,
   $R_7$ is hydrogen or methyl,
   $R_8$ is a $C_2$-$C_6$ hydrocarbon radical having (m2+1) valencies,
   $X_3$ is a sulfur linkage of —S— or a tertiary amino linkage of —$NR_{13}$— in which $R_{13}$ is $C_1$-$C_1$ alkyl, hydroxyethyl, hydroxypropyl, or 2,3-dihydroxypropyl,
   (3) third repeating units of at least one hydrophilic N-vinyl amide monomer,
   (4) optionally fourth repeating units of at least one second polysiloxane vinylic crosslinker having 0 to 35 fourth H-donor moieties, and
   (5) fifth repeating units of a blending vinylic monomer selected from the group consisting of a $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene, t-butyl styrene, trifluoroethyl (meth)acrylate, hexafluoro-isopropyl (meth)acrylate, hexafluorobutyl (meth)acrylate, and combinations thereof,
wherein the second repeating units of said at least one first polysiloxane vinylic crosslinker are different from the fourth repeating units of said at least one second polysiloxane vinylic crosslinkers, wherein the first, second, and fourth H-donor moieties independent of one another are hydroxyl groups, carboxyl groups, amino groups of —NHR°, amino linkages of —NH—, amide linkages of —CONH—, urethane linkages of —OCONH—, or combinations thereof, wherein R° is H or a $C_1$-$C_4$ alkyl,
wherein the silicone hydrogel bulk material comprises at least 8.8 mmoles of the third repeating units per gram of all the first, second and fourth repeating units in total and at least 0.11 meqs of all the first, second, and fourth H-donor moieties in total per gram of the third repeating units,
wherein the silicone hydrogel contact lens has an oxygen permeability of at least 50 barrers, an elastic modulus of from 0.2 MPa to 1.5 MPa, and an equilibrium water content of from 40% to 70% by weight and is inherently wettable as characterized by having a water-break-up-time of at least 10 seconds and a water contact angle by captive bubble of 80 degrees or less without being subjected to any post-curing surface treatment.

2. The silicone hydrogel contact lens of claim 1, wherein $R_4$ is a monovalent radical of one of formula (2a) to (2y)

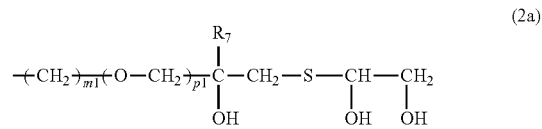

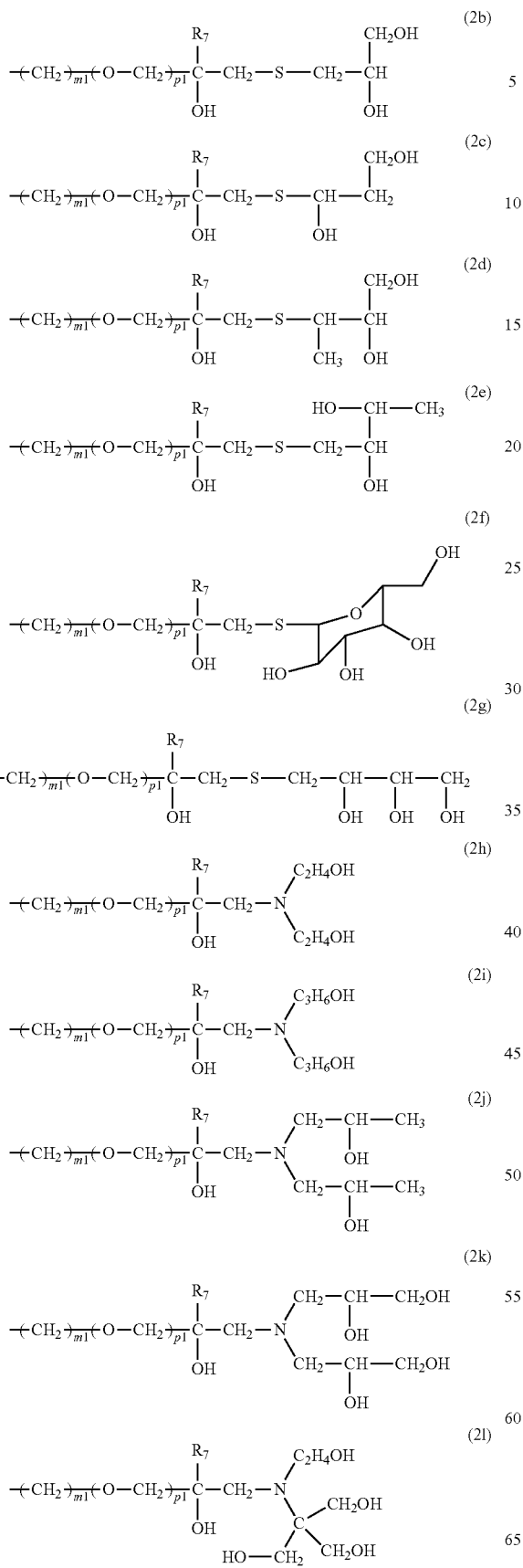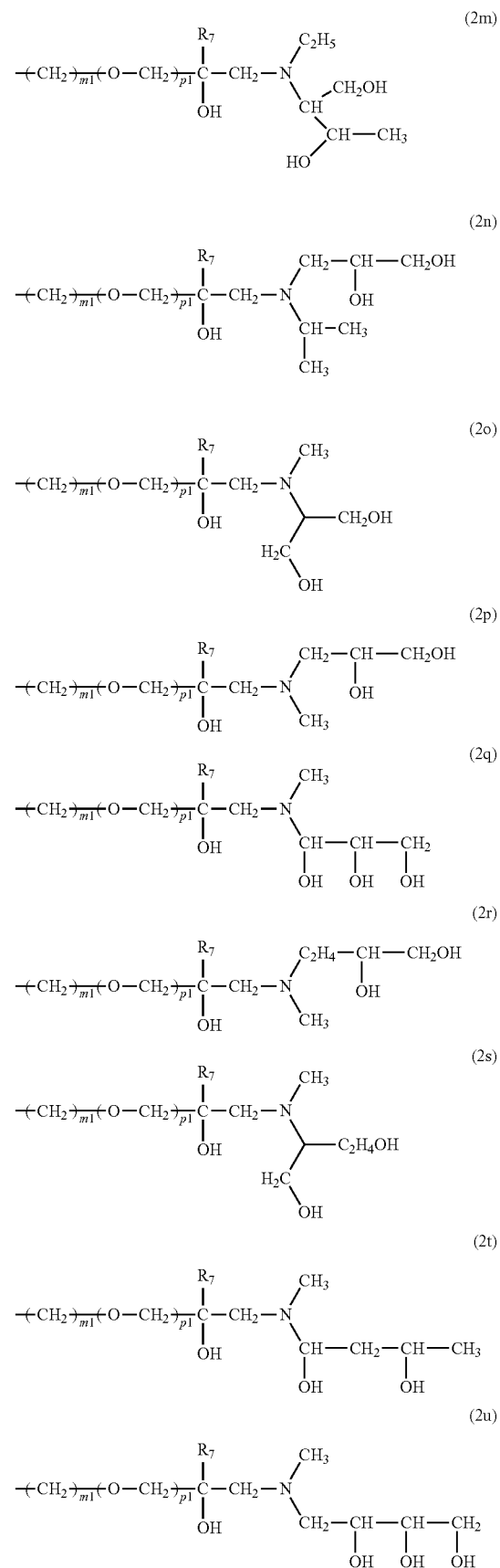

-continued

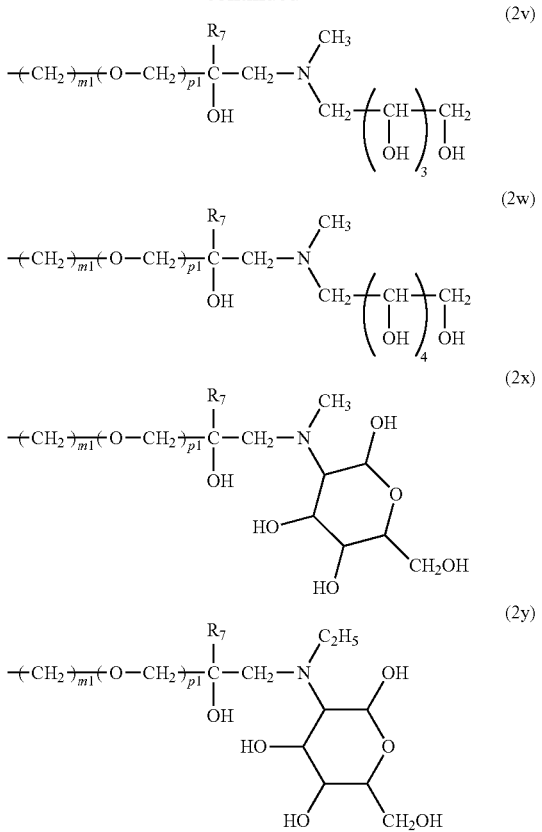

in which p1 is zero or 1, m1 is an integer of 2 to 4, $R_7$ is hydrogen or methyl.

3. The silicone hydrogel contact lens of claim 1, wherein the siloxane-containing vinylic monomer is a mono-(meth)acryloyl-terminated, monoalkyl-terminated polysiloxane of formula (I)

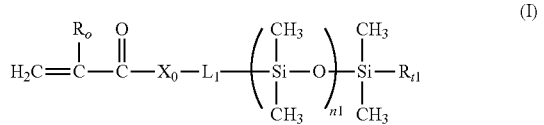

in which: $R_o$ is H or methyl; $X_o$ is O or $NR_1$; $L_1$ is a $C_3$-$C_8$ alkylene divalent radical or a divalent radical of

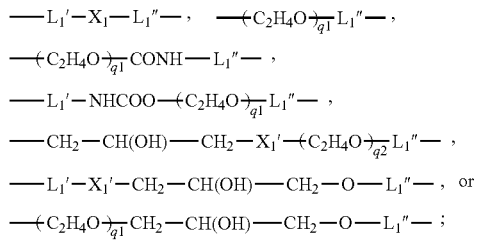

$L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ is a $C_1$-$C_4$ alkyl; $X_1'$ is O or $NR_1$; q1 is an integer of 1 to 20; q2 is an integer of 0 to 20; n1 is an integer of 3 to 25.

4. The silicone hydrogel contact lens of claim 3, wherein the siloxane-containing vinylic monomer is α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxy-propyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxypropyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxy-propylamino-2-hydroxypropyloxypropyl]-terminated ω-butyl (or ω-methyl) terminated polydimethylsiloxane, α-[3-(meth)acryloxybutylamino-2-hydroxypropyloxypropyl]-terminated ω-butyl (or ω-methyl) terminated polydimethylsiloxane, α-(meth)acryloxy-(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxy-propyl terminated ω-butyl (or ω-methyl) terminated polydimethylsiloxane, α-[3-(meth)acrylamidoethoxy-2-hydroxypropyloxypropyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)-dimethylbutylsilane) (meth)acrylamide, (meth)acryloylamidopropyltetra(dimethylsiloxy)-dimethylbutylsilane, or a mixture thereof.

5. The silicone hydrogel contact lens of claim 3, wherein the hydrophilic N-vinyl amide monomer is N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof.

6. The silicone hydrogel contact lens of claim 5, wherein the silicone hydrogel bulk material further comprises repeating units of one or more non-silicone vinylic crosslinking agents.

7. The silicone hydrogel contact lens of claim 5, wherein the silicone hydrogel bulk material further comprises repeating units of the blending vinylic monomer which is methyl methacrylate.

8. The silicone hydrogel contact lens of claim 5, wherein the silicone hydrogel bulk material further comprises repeating units of at least one UV-absorbing vinylic monomer and optionally repeating units of at least one UV/HEVL-absorbing vinylic monomer.

9. The silicone hydrogel contact lens of claim 8, wherein the silicone hydrogel bulk material further comprises repeating units of 2-[2'-hydroxy-5'-(2-methacryloxyethyl)phenyl)]-2H-benzotriazole and at least one UV/HEVL-absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, and combinations thereof.

10. The silicone hydrogel contact lens of claim 8, wherein the silicone hydrogel contact lens is characterized by having the UVB transmittance of 10% or less between 280 and 315 nanometers and a UVA transmittance of 30% or less between 315 nm and 380 nm and and a Violet transmittance of 70% or less between 380 nm and 440 nm.

11. The silicone hydrogel contact lens of claim 5, wherein the silicone hydrogel bulk material further comprises repeating units of one or more hydrophilic acrylic monomers selected from the group consisting of N,N-dimethyl (meth)acrylamide, (meth)acrylamide, N-hydroxyethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth)acrylate having a number average molecular weight of up to 1500, N-[tris(hydroxymethyl)methyl]-acrylamide, (meth)acrylic acid, ethylacrylic acid, and combinations thereof.

12. The silicone hydrogel contact lens of claim 6, wherein the silicone hydrogel bulk material further comprises repeating units of at least one UV-absorbing vinylic monomer and optionally repeating units of at least one UV/HEVL-absorbing vinylic monomer.

13. The silicone hydrogel contact lens of claim 12, wherein the silicone hydrogel bulk material further comprises repeating units of 2-[2'-hydroxy-5'-(2-methacryloxyethyl)phenyl)]-2H-benzotriazole and at least one UV/HEVL-absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, and combinations thereof.

14. The silicone hydrogel contact lens of claim 12, wherein the silicone hydrogel contact lens is characterized by having the UVB transmittance of 10% or less between 280 and 315 nanometers and a UVA transmittance of 30% or less between 315 nm and 380 nm and and a Violet transmittance of 70% or less between 380 nm and 440 nm.

15. The silicone hydrogel contact lens of claim 6, wherein the silicone hydrogel bulk material further comprises repeating units of one or more hydrophilic acrylic monomers selected from the group consisting of N,N-dimethyl (meth)acrylamide, (meth)acrylamide, N-hydroxyethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth)acrylate having a number average molecular weight of up to 1500, N-[tris(hydroxymethyl)methyl]-acrylamide, (meth)acrylic acid, ethylacrylic acid, and combinations thereof.

16. The silicone hydrogel contact lens of claim 7, wherein the silicone hydrogel bulk material further comprises repeating units of at least one UV-absorbing vinylic monomer and optionally repeating units of at least one UV/HEVL-absorbing vinylic monomer.

17. The silicone hydrogel contact lens of claim 16, wherein the silicone hydrogel bulk material further comprises repeating units of 2-[2'-hydroxy-5'-(2-methacryloxyethyl)phenyl)]-2H-benzotriazole and at least one UV/HEVL-absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, and combinations thereof.

18. The silicone hydrogel contact lens of claim 16, wherein the silicone hydrogel contact lens is characterized by having the UVB transmittance of 10% or less between 280 and 315 nanometers and a UVA transmittance of 30% or less between 315 nm and 380 nm and and a Violet transmittance of 70% or less between 380 nm and 440 nm.

19. The silicone hydrogel contact lens of claim 7, wherein the silicone hydrogel bulk material further comprises repeating units of one or more hydrophilic acrylic monomers selected from the group consisting of N,N-dimethyl (meth)acrylamide, (meth)acrylamide, N-hydroxyethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth)acrylate having a number average molecular weight of up to 1500, N-[tris(hydroxymethyl)methyl]-acrylamide, (meth)acrylic acid, ethylacrylic acid, and combinations thereof.

20. The silicone hydrogel contact lens of claim 1, wherein the silicone hydrogel contact lens has a water-break-up-time of at least 15 seconds and/or a water contact angle by captive bubble of 70 degrees or less without being subjected to any post-curing surface treatment.

* * * * *